United States Patent [19]

Sizer et al.

[11] E Re. 30,070

[45] Reissued Aug. 14, 1979

[54] APPARATUS FOR TREATING WELLS

[75] Inventors: Phillip S. Sizer, Dallas; Carter R. Young, Lewisville, both of Tex.

[73] Assignee: Otis Engineering Corporation, Dallas, Tex.

[21] Appl. No.: 735,584

[22] Filed: Oct. 26, 1976

Related U.S. Patent Documents

Reissue of:

[64] Patent No.: 3,848,668
Issued: Nov. 19, 1974
Appl. No.: 210,727
Filed: Dec. 22, 1971

[51] Int. Cl.[2] ..... E21B 23/00

[52] U.S. Cl. ..... 166/72; 166/55; 166/315; 166/217

[58] Field of Search ..... 166/71, 72, 315, 125, 166/216, 217, 215

[56] References Cited

U.S. PATENT DOCUMENTS

| | | | |
|---|---|---|---|
| 2,251,125 | 7/1941 | Gardner | 166/215 |
| 2,917,115 | 12/1959 | Stanberry | 166/216 |
| 2,918,125 | 12/1959 | Sweetman | 166/297 |
| 3,208,531 | 9/1965 | Tomplen | 166/125 |
| 3,216,501 | 11/1965 | Page | 166/72 |
| 3,380,528 | 4/1968 | Timmons | 166/277 |
| 3,411,584 | 11/1968 | Sizer et al. | 166/72 |
| 3,696,868 | 10/1972 | Taylor | 166/315 |
| 3,731,742 | 5/1973 | Sizer et al. | 166/315 |

*Primary Examiner*—Ernest R. Purser
*Attorney, Agent, or Firm*—Vinson & Elkins

[57] ABSTRACT

A method of and apparatus for treating wells to provide surface controlled subsurface safety systems in the wells, whether previously completed wells or newly completed wells. A method and apparatus is provided for installing receptacles in the well flow conductors below the surface for receiving surface controlled subsurface safety valves therein for controlling undesired flow from the well in the event of emergency, disaster or accident damaging the well surface flow controlling system or threatening the integrity thereof. Also, a method and apparatus is provided for installing a hanger for well flow conductors in the well casing below the surface for supporting the flow conductor or conductors in the well casing below the surface and then installing the receptacles in the well flow conductors below the surface for receiving surface controlled subsurface safety valves therein.

19 Claims, 44 Drawing Figures

APPARATUS FOR TREATING WELLS

Matter enclosed in heavy brackets [ ] appears in the original patent but forms no part of this reissue specification; matter printed in italics indicates the additions made by reissue.

SUBJECT MATTER AND OBJECTS OF THE INVENTION

This application is related to the coassigned copending application of Henry J. James and Carter R. Young, Ser. No. 270,977, filed July 12, 1972, for Method of and Apparatus for Treating and Completing Wells.

This invention relates to new and useful improvements in methods of and apparatus for equipping wells with surface controlled subsurface safety valves, either before or after the well has been completed in the usual manner.

Heretofore, when a well has been completed it has been necessary to remove the tubing string or strings from within the well bore in the casing, first killing the well, unseating the packers, and then removing the string and packers and other fittings from the well prior to installing new strings of pipe, refitted or new packers, subsurface safety valve receptacles and control fluid lines for the valves, then reinstalling the tubing hanger and surface controls and flow lines, including an exit fitting for the control fluid pressure line at the surface before the well could be returned to production. This is an expensive and time consuming operation, and may result in damage to the producing formation of the well as a result of the loading fluid used and other operations performed in making the revised installation. Such operations are expensive due to the heavy equipment and the long period of time required for their performance. Also, the deleterious effects of the treating and loading fluids on the producing formation often result in a reduction in the productivity or flow of desirable fluids from the formation and a commensurate reduction in the value of the well.

It is, therefore, one object of the invention to provide a new and improved method of and system for installing surface controlled subsurface safety valves in the conductor or conductors of wells.

A particular object of the invention is to provide a method of and system for installing surface controlled subsurface safety valves in the flow conductor or conductors of wells which have been previously completed with the flow conductor or conductors in place therein.

An important object of the invention is to provide a method of and apparatus for disconnecting the upper portion of one or more flow conductors in a well from the remainder of such conductors therebelow and installing a receptacle and replacement upper flow conductor portion in flow communication with each of such flow conductors therebelow with a surface controlled subsurface safety valve in such replacement upper flow conductor portion for controlling fluid flow through each such flow conductor.

A further object of the invention is to provide a method and apparatus of the character set forth wherein the receptacle and replacement upper flow conductor portion are provided with means for detachably connecting the receptacle and replacement upper flow conductor portion for each flow conductor of the well to permit removal and replacement of the replacement upper flow conductor portion and the safety valve when desired.

Still another object is to provide a method and apparatus as set forth wherein the surface controlled subsurface safety valve is insertable and removable independently of the replacement upper flow conductor portion.

A further important object of the invention is to provide a method and apparatus of the character set forth wherein a supplementary surface controlled subsurface safety valve may be installed in the replacement upper flow conductor portion in the event of the original safety valve becoming inoperative or ineffective.

A further object of the invention is to provide in a method and apparatus of the character set forth means for directing a hanger into place over a flow conductor in place in the well and actuating the hanger into anchoring supporting engagement with the casing and the flow conductor either before or after the upper portion of the flow conductor above the hanger has been removed from connection with the flow conductor therebelow.

A further particular object of the invention is to provide a method and apparatus for servicing wells to provide a subsurface hanger in the well engaging between the flow conductor and the well casing and supporting the flow conductor therebelow against longitudinal downward movement in the casing, then installing a receptacle and replacement upper flow conductor portion above the hanger in flow communication with the upper end of the flow conductor remaining in place in the well casing for receiving a surface controlled subsurface safety valve in the receptacle for controlling fluid flow through the conductor and replacement upper flow conductor portion to the surface in the event of either an imminent or impeding disaster or under any other desired circumstances, and wherein the method and apparatus in installable in wells already previously completed without removing from the well flow conductors, or packer, or other well tools connected therewith already in place in the well below the point of connection of the hanger with the flow conductor.

A further object of the invention is to provide a method and apparatus of the character described which may be used with either single flow conductor well installations or in multiple flow conductor well installations for controlling fluid flow through the conductors to the surface.

Still another object of the invention is to provide a method and apparatus of the character described which is adapted for use in wells in which the well is serviced or treated by means of through the flow line pump-down operations, and in which the pump-down tools may be moved through the surface controlled subsurface safety valve and receptacle and hanger without affecting the customary operation of such pump-down tools.

It is still another object of the invention to provide a method and apparatus of the character described wherein the installation may be made without rotary manipulation of the flow conductor in place in the well, particularly that portion thereof left in place in the well; and wherein the surface controlled subsurface safety valve and replacement upper flow conductor portion may be removed and replaced without rotation thereof.

Still another object of the invention is to provide an apparatus and method of the character described wherein the replacement upper flow conductor portion or extension and the well equipment at the surface may be readily replaced with a minimum of cost, time, and labor by merely replacing the well head, if damaged, the replacement upper flow conductor portion and the surface controlled subsurface safety valve and its appurtenances.

Still another object of the invention is to provide a method and apparatus for servicing a well, which has been previously completed, to install a subsurface hanger below the surface in the casing for supporting the upper end of the flow conductor in the well casing, and wherein guide means is connected with the upper end of the flow conductor to be left in place in the well for guiding the hanger, receptacle and replacement flow conductor portion and safety valve into position to engage, anchor and seal with the upper end of the flow conductor or conductors to be left in place in the well casing below the point at which the upper portion of the conductor thereabove is to be removed; and wherein the upper portion of the flow conductor above the hanger may be disconnected from the portion to be left in the well by unscrewing or severing the same in any desired manner; and wherein the guide means is removable after the receptacle, replacement upper flow conductor portion, and safety valve have been positioned in flow communication with the upper end of each desired flow conductor in place in the well.

A further object of the invention is to provide a method and apparatus of the character set forth wherein the guide means connected to each flow conductor left in place in the well provides for positively directing the receptacle, safety valve, and replacement upper flow conductor portion into separate flow communication with a predetermined one of the flow conductors left in place in the well, after which the guide means is removable for normal operation of the well.

Still another object is to provide a method and apparatus of the character set forth wherein the replacement upper flow conductor portion includes a landing nipple having a control fluid pressure conductor communicating its bore with a source of control fluid pressure at the surface and the surface controlled subsurface safety valve insertable and removable through the replacement upper flow conductor into and out of said landing nipple and includes a normally closed valve means operable to open position by the control fluid pressure in the bore of the landing nipple acting thereon.

A further object is to provide a method and apparatus of the character set forth wherein the surface controlled subsurface safety valve comprises a section of the replacement upper flow conductor portion and a landing nipple is connected to such replacement upper flow conductor portion adjacent the safety valve for receiving a supplementary surface controlled subsurface safety valve insertable into and removable from said landing nipple through said replacement upper flow conductor portion for controlling flow therethrough in the event of the original safety valve becoming inoperative or ineffective, and wherein said supplementary safety valve is normally closed and operated to open position by control fluid pressure directed thereto from said original safety valve.

*Another object is to provide a shifting tool engagable with the smooth bore of a latch sleeve to shift the sleeve.*

Additional objects and advantages of the invention will be readily apparent from the reading of the following description of a device constructed in accordance with the invention, and reference to the accompanying drawings thereof, wherein.

Figure 1:
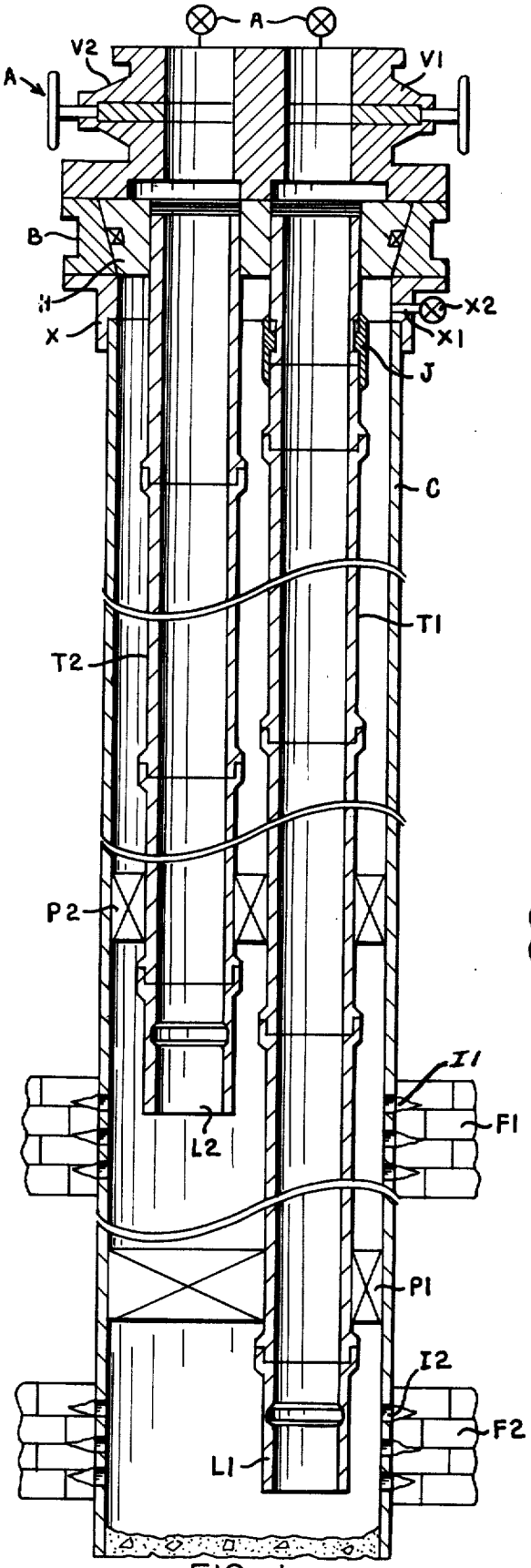
FIG. 1 is a schematic vertical sectional view of a completed cased well having a pair of flow conductors therein suspended from the surface and having their lower inlet ends separated by packers which also separate the producing zones in the well bore.
Figure 5:
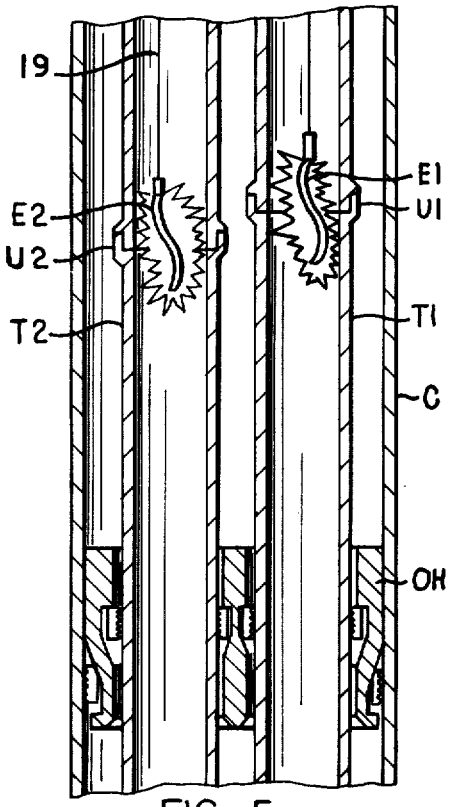
FIG. 5 is a fragmentary view of the flow conductors and tubing hanger showing means for loosening the upper portion of the flow conductors above the hanger for removal from the well.
Figure 13A:
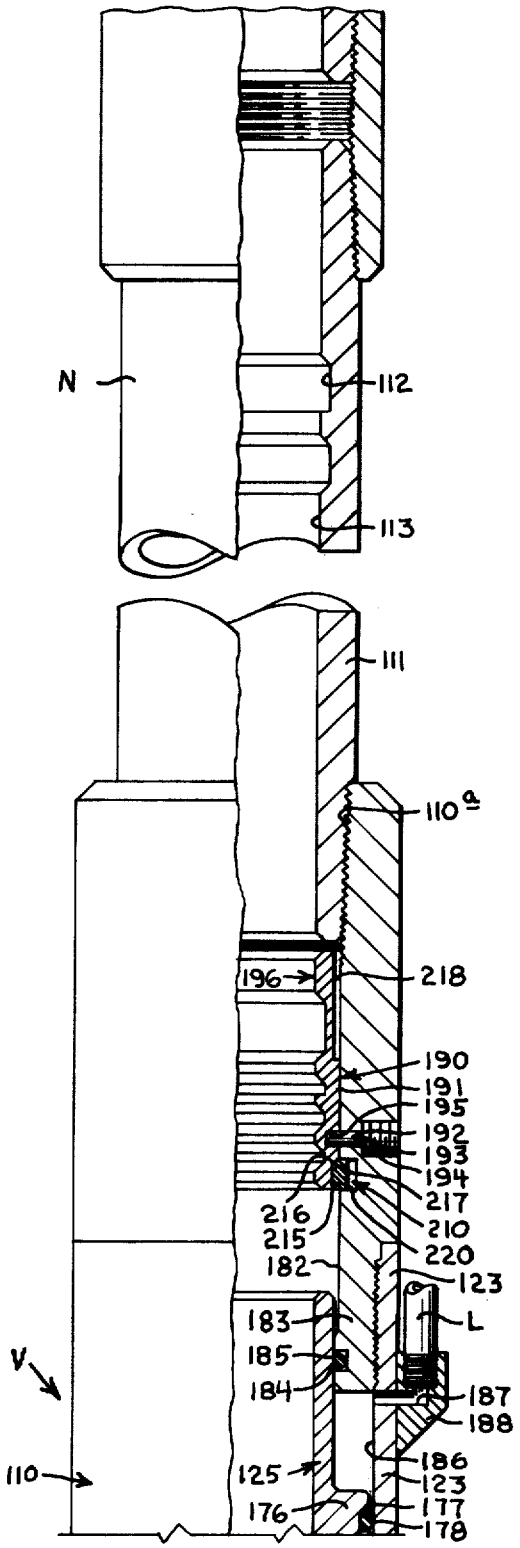
FIGS. 13A, 13B, 13C and 13D are longitudinal vertical views, partly in elevation and partly in section, showing the details of construction of the surface controlled subsurface safety valve and latching mechanism located in the receptacle in position for anchoring the safety valve in place in the well.
Figure 13B:
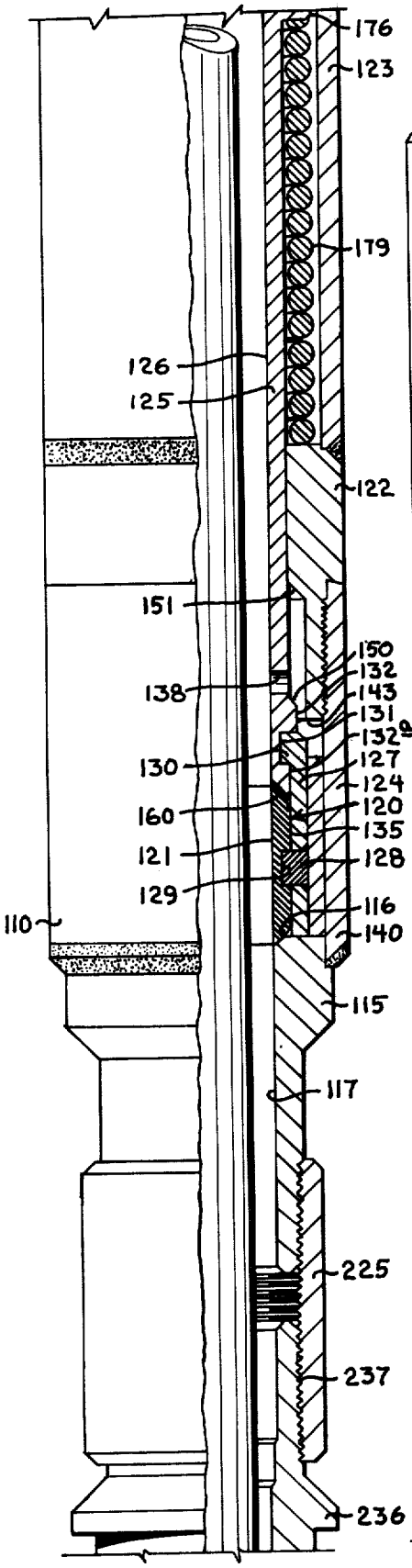
Figure 15A:
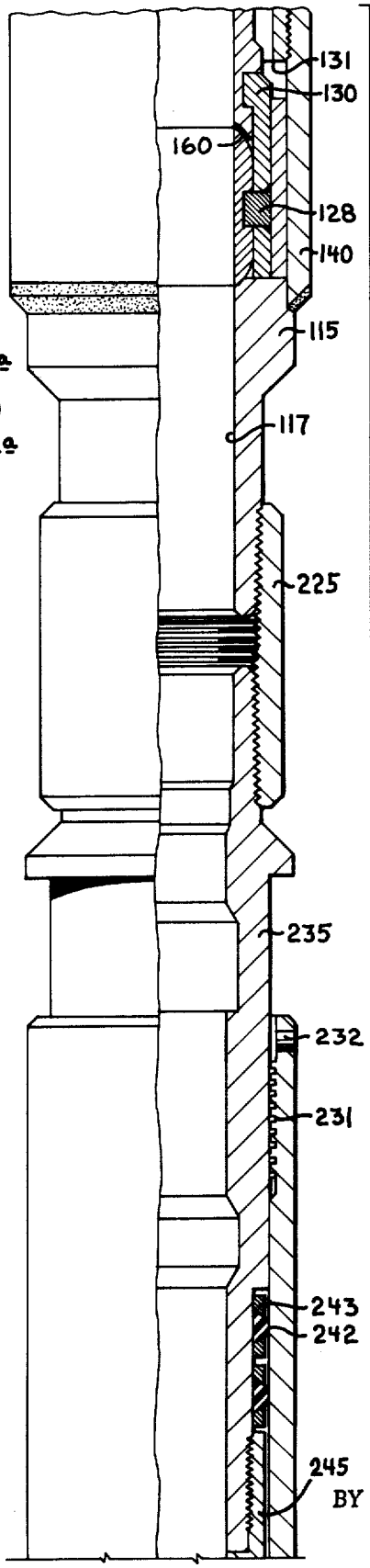
FIGS. 15A and 15B are fragmentary views, partly in elevation and partly in section, of the latching mechanism and lower portion of the safety valve showing the same anchored in sealing operating condition in the receptacle, ready for flow of well fluids therethrough.
Figure 15B:
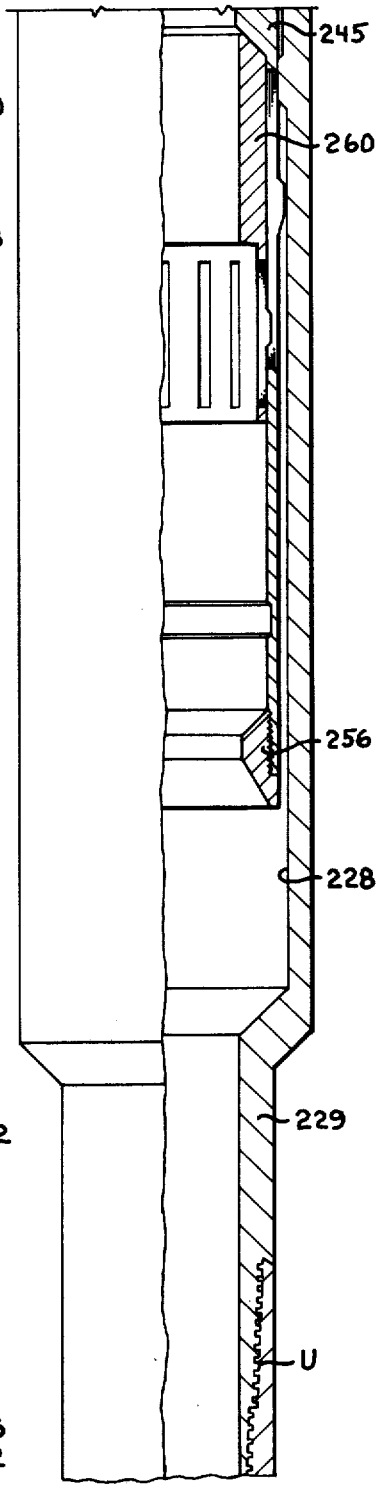
Figure 17:
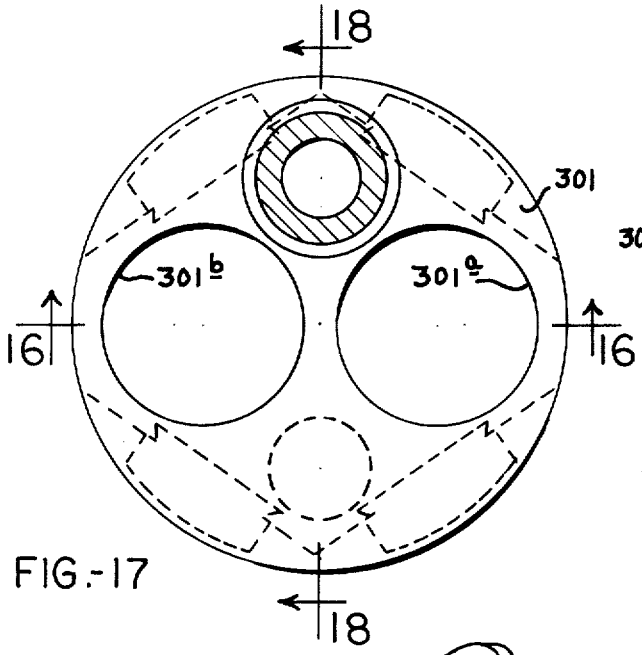
FIG. 17 is a horizontal cross-sectional view taken on the line 17—17 of FIG. 16A.
Figure 18A:
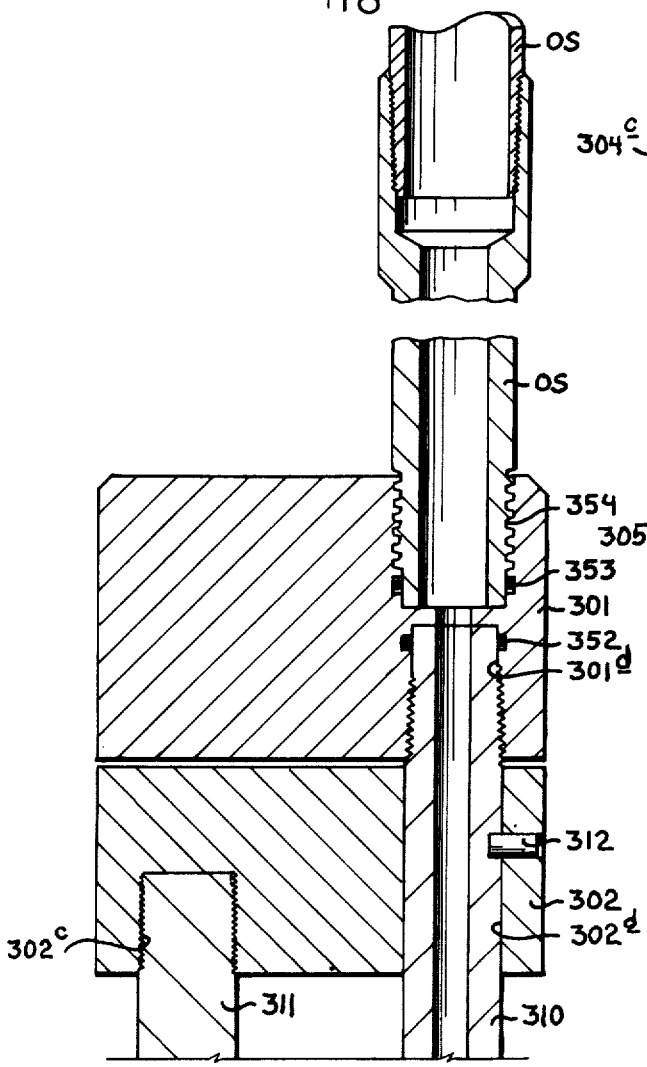
Figure 18B:
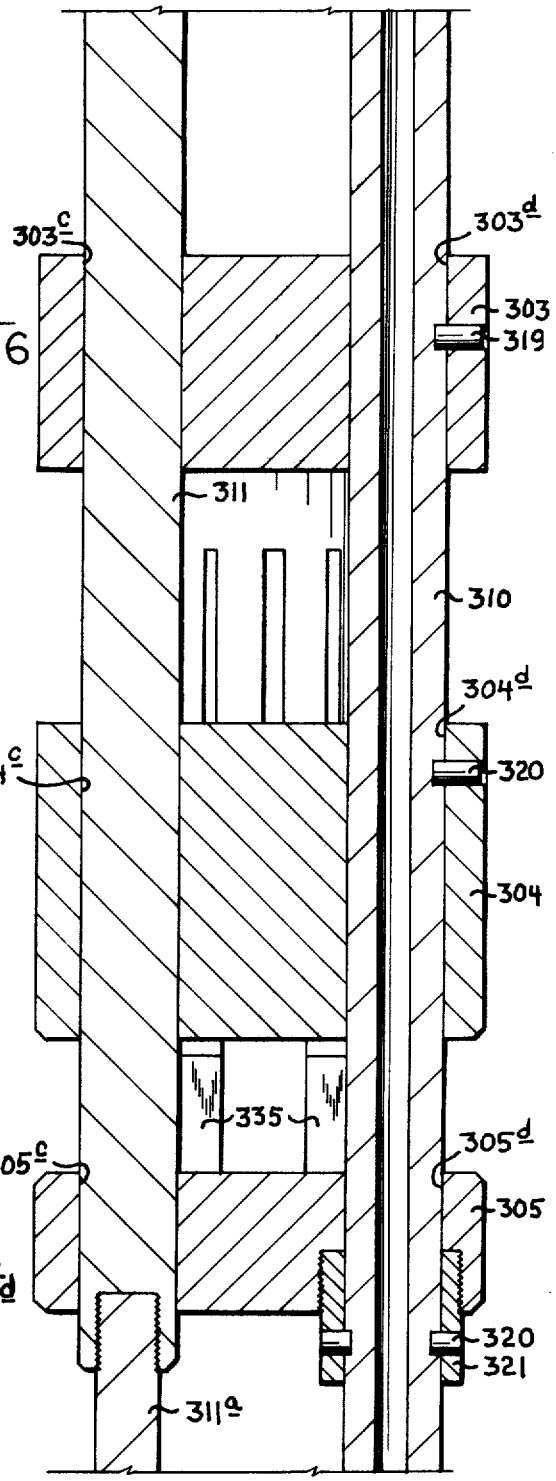
Figure 18C:
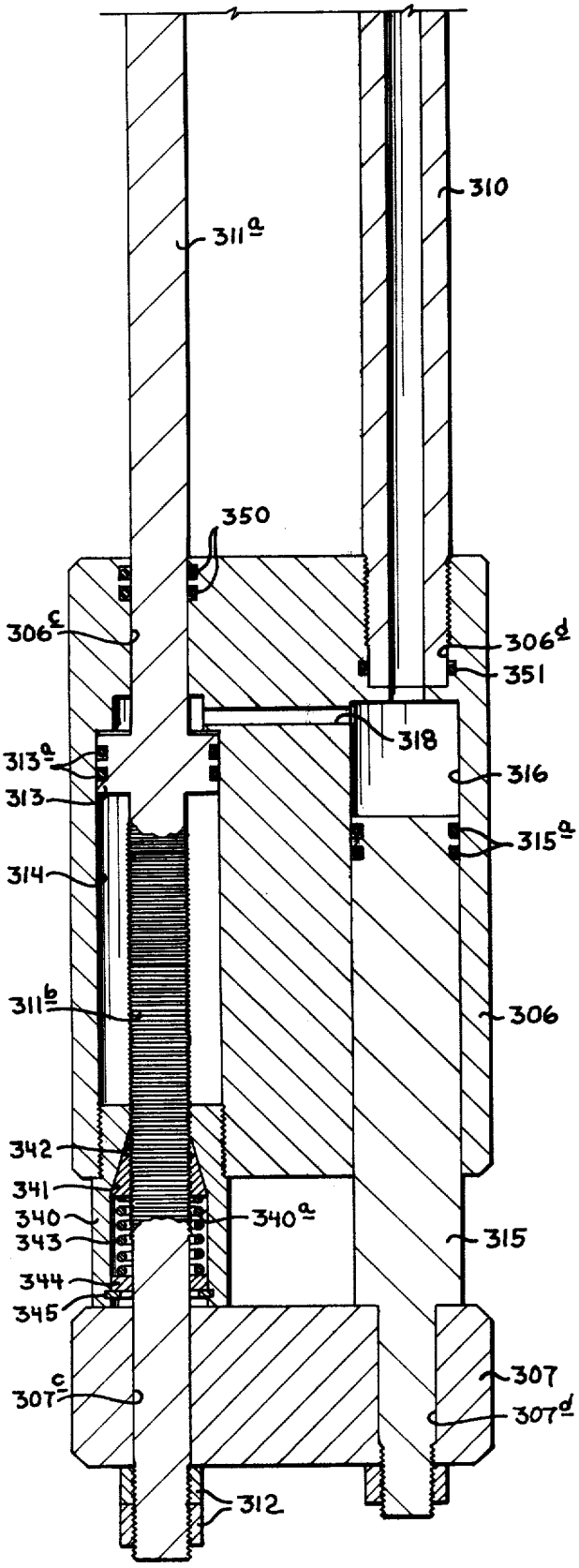
Figure 20A:
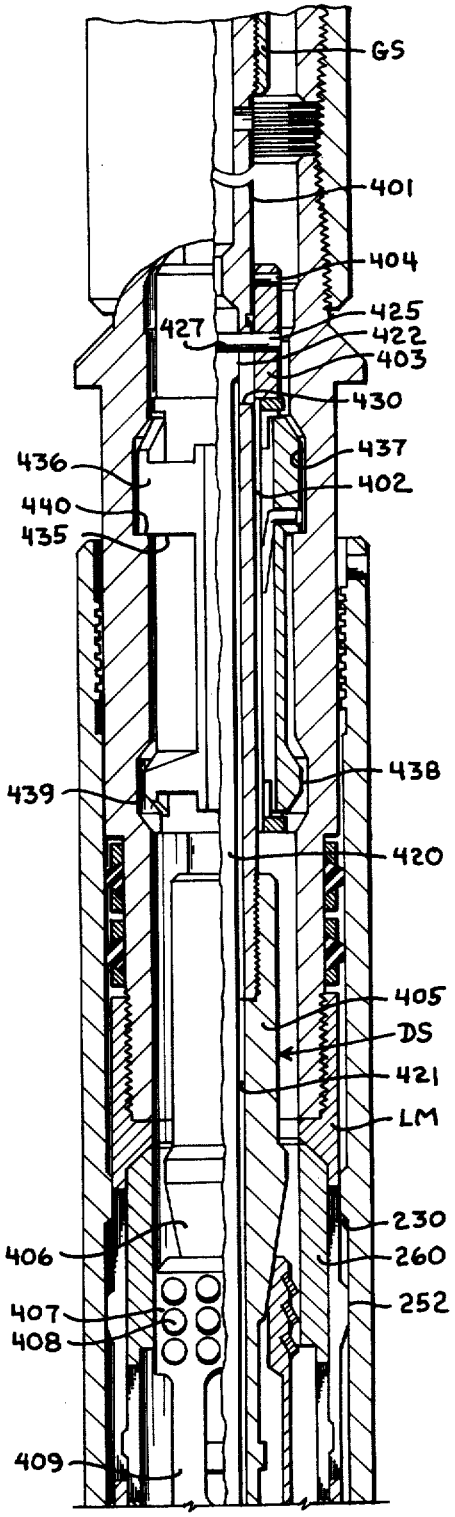
Figure 20B:
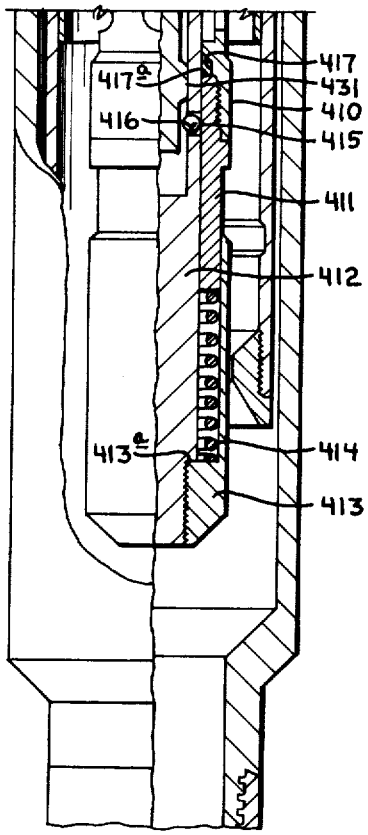
Figure 19:
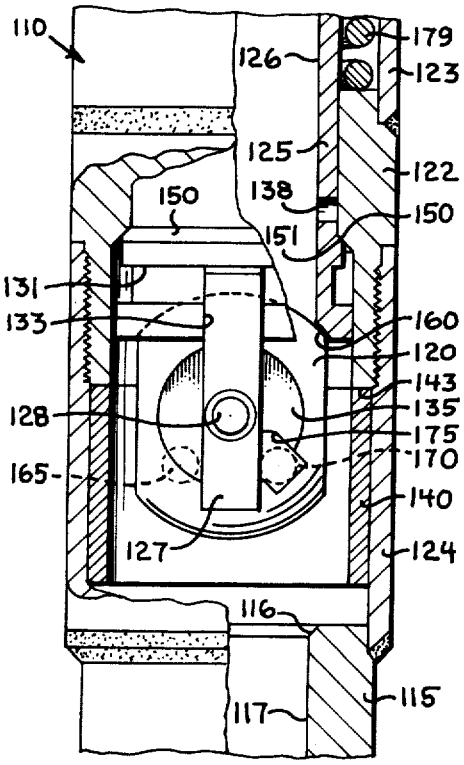
Figure 21:
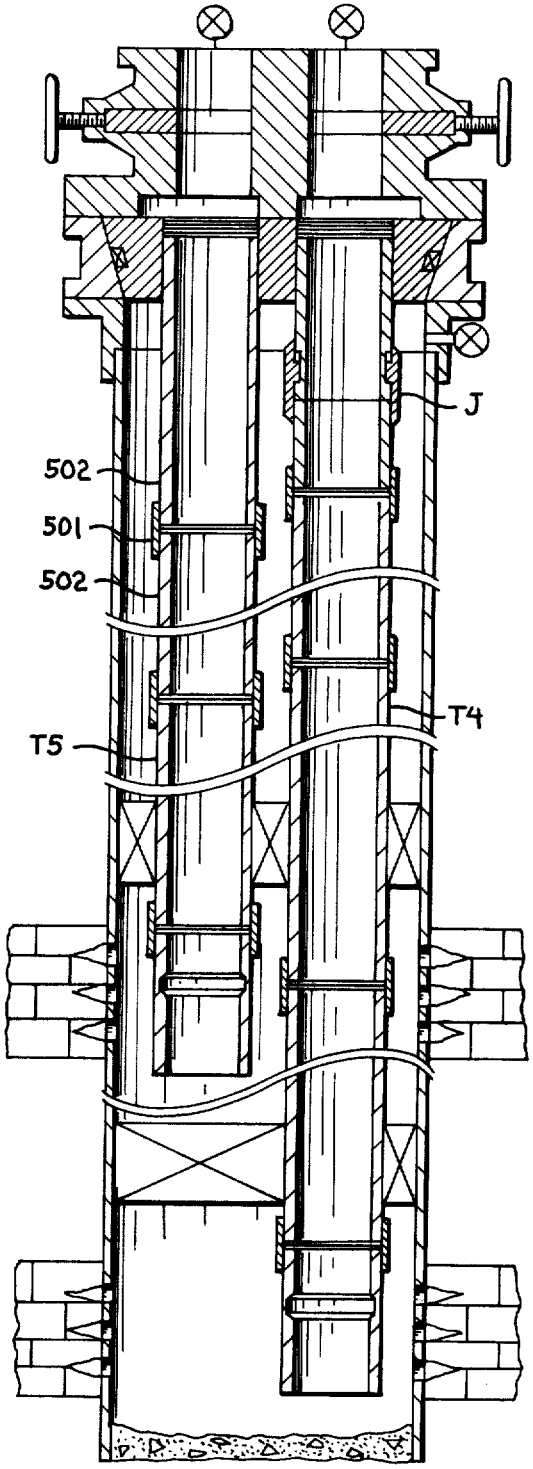
Figure 22:
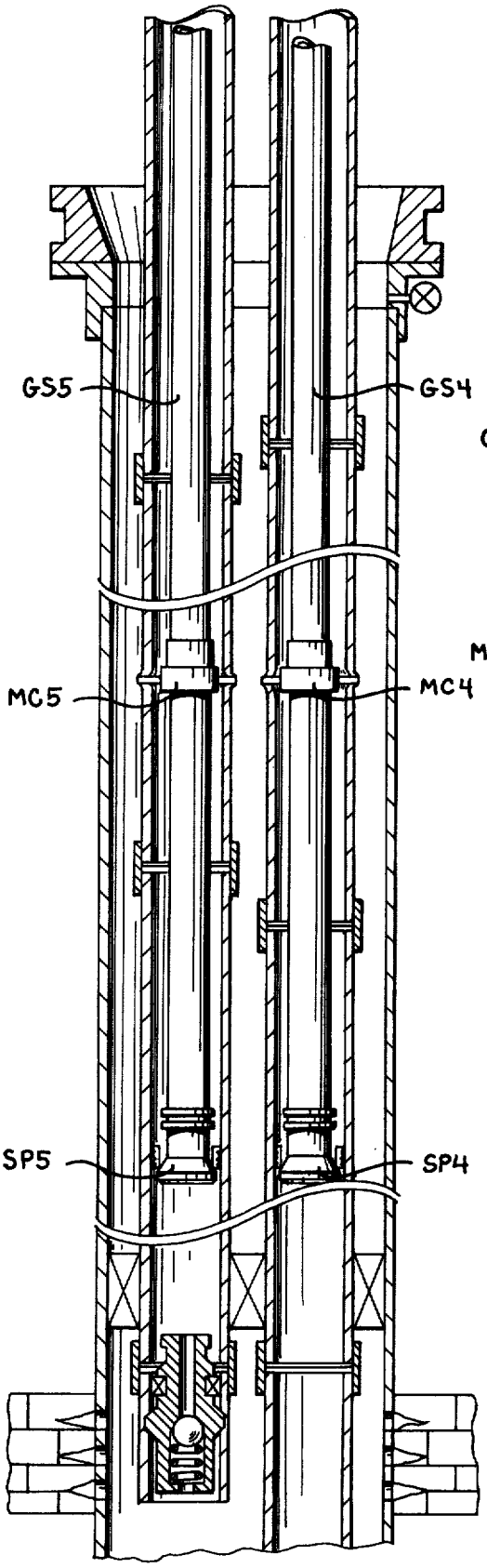
Figure 23:
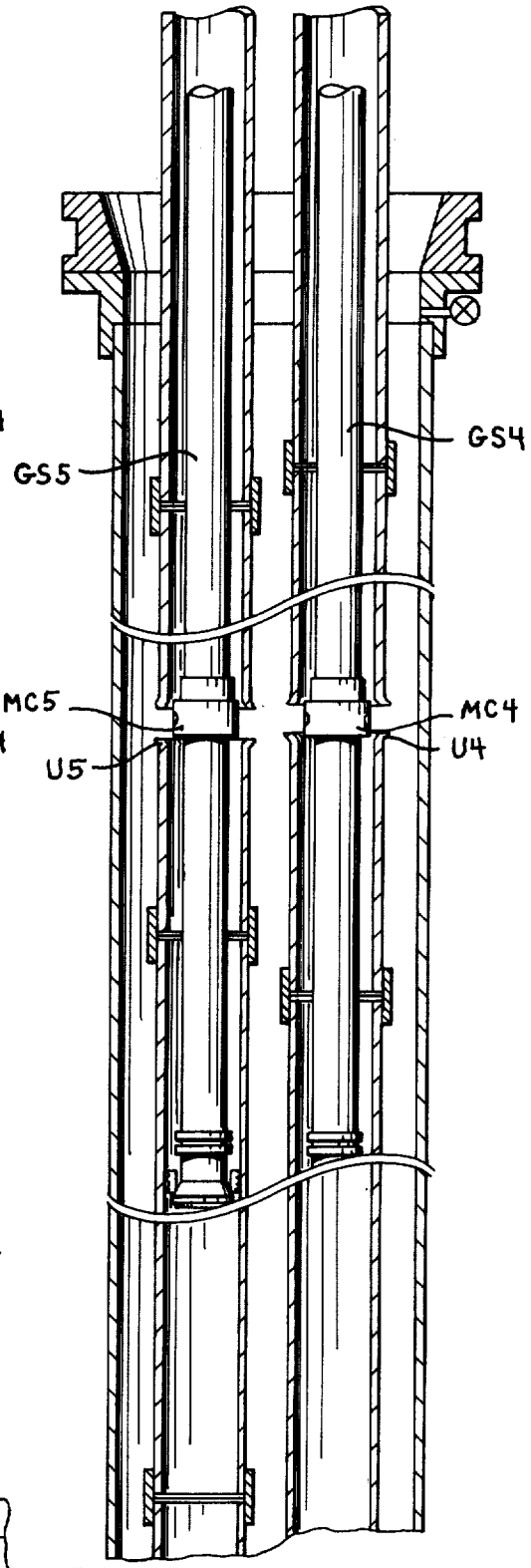
Figure 24:
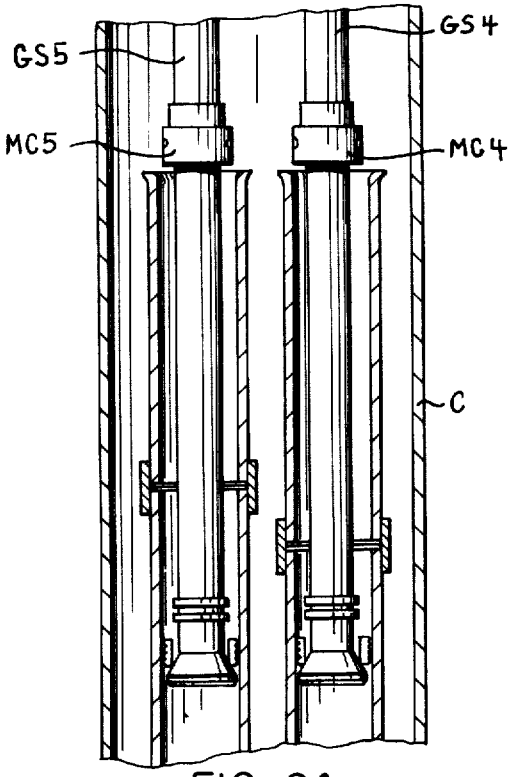
Figure 26:
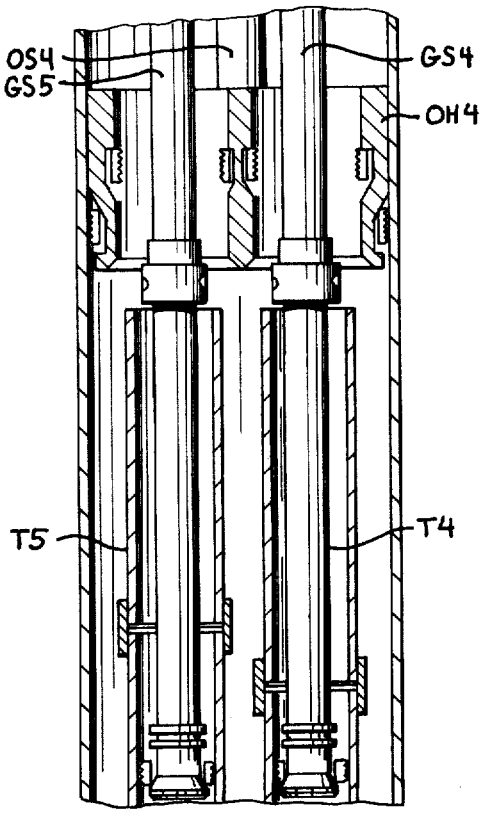
Figure 25:
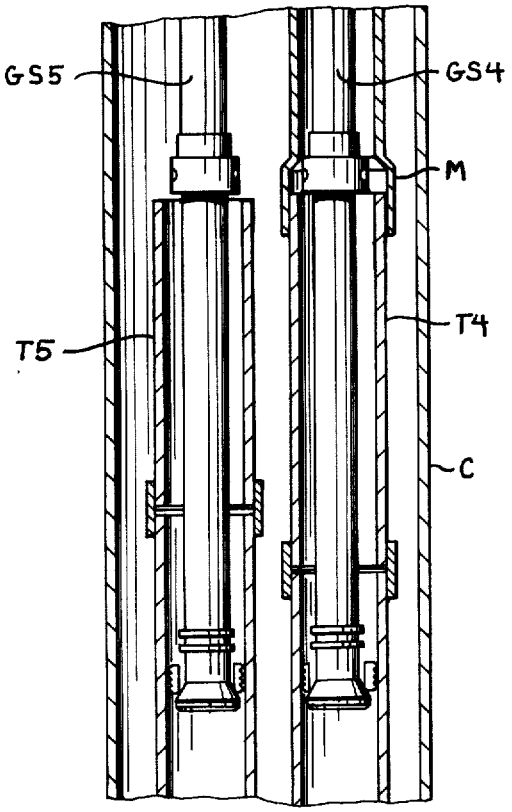
Figure 27:
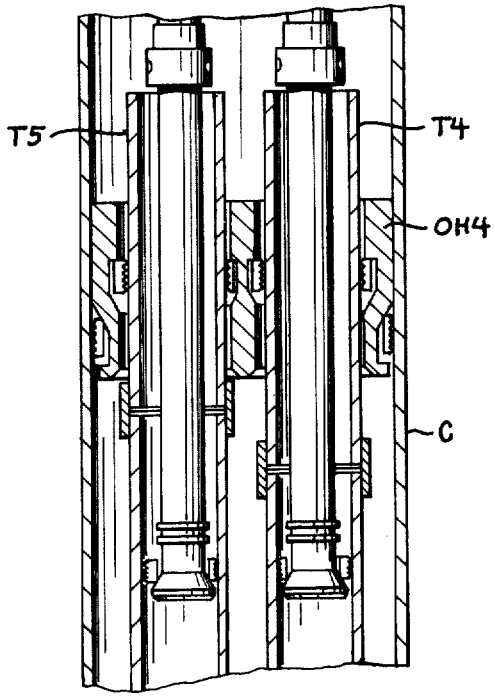
Figure 28:
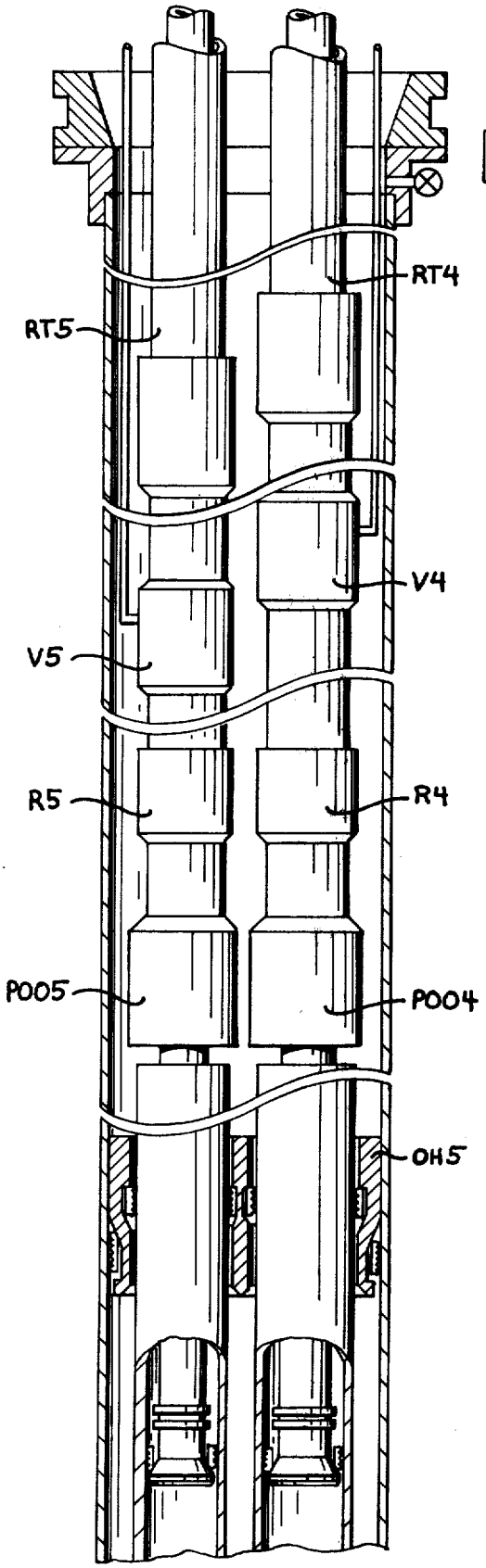
Figure 29:
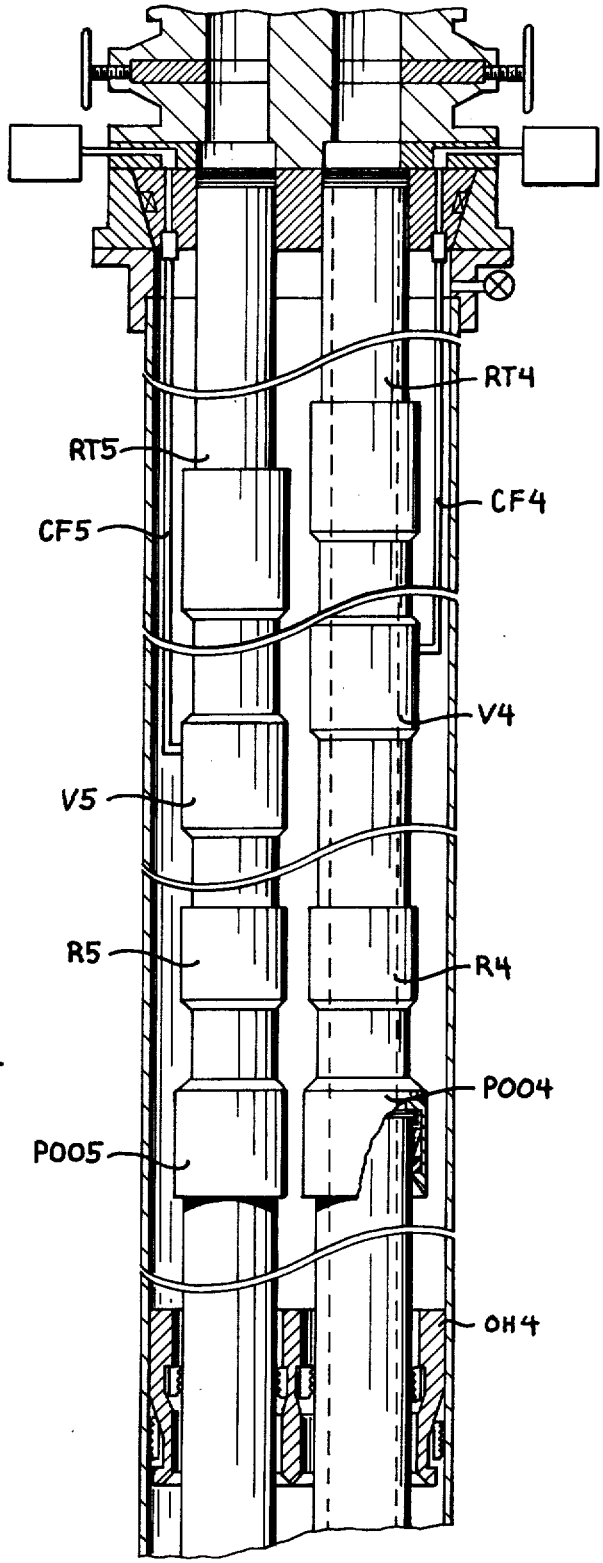
Figure 30:
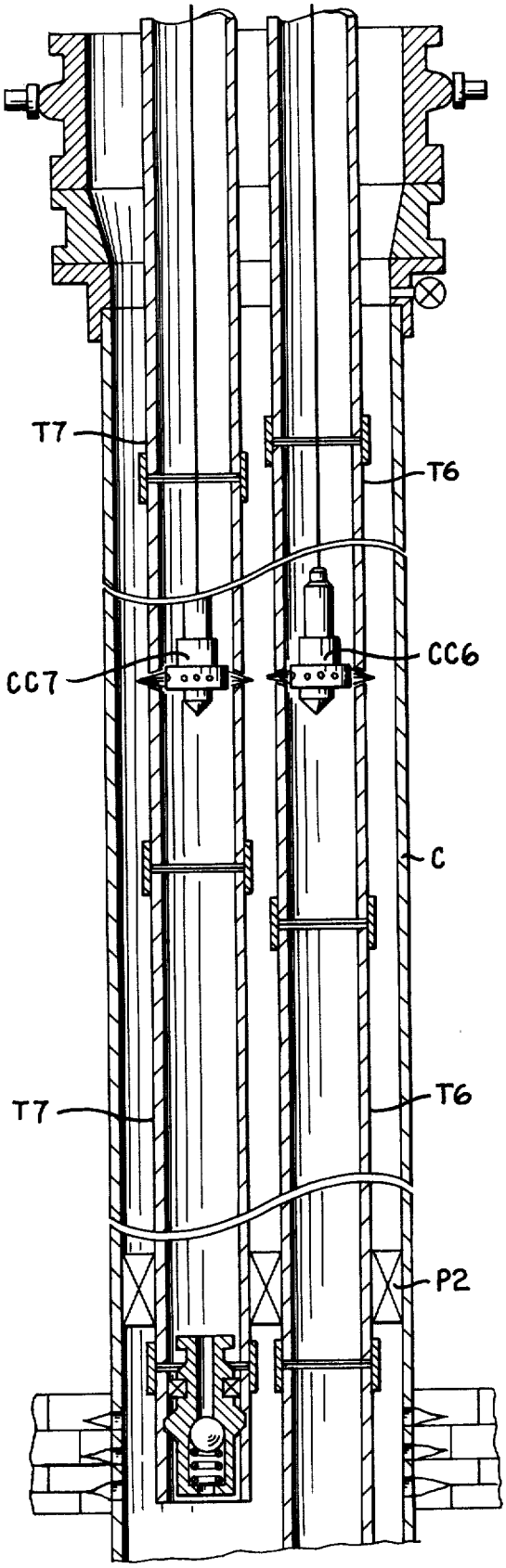
Figure 31:
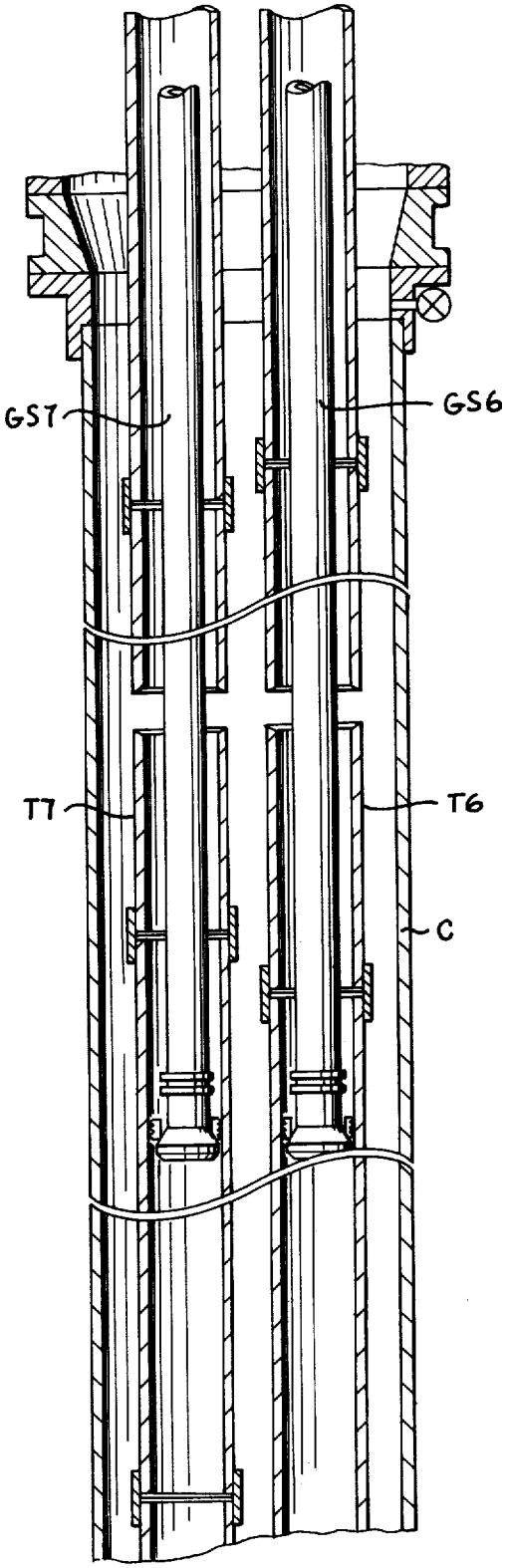
Figure 32:
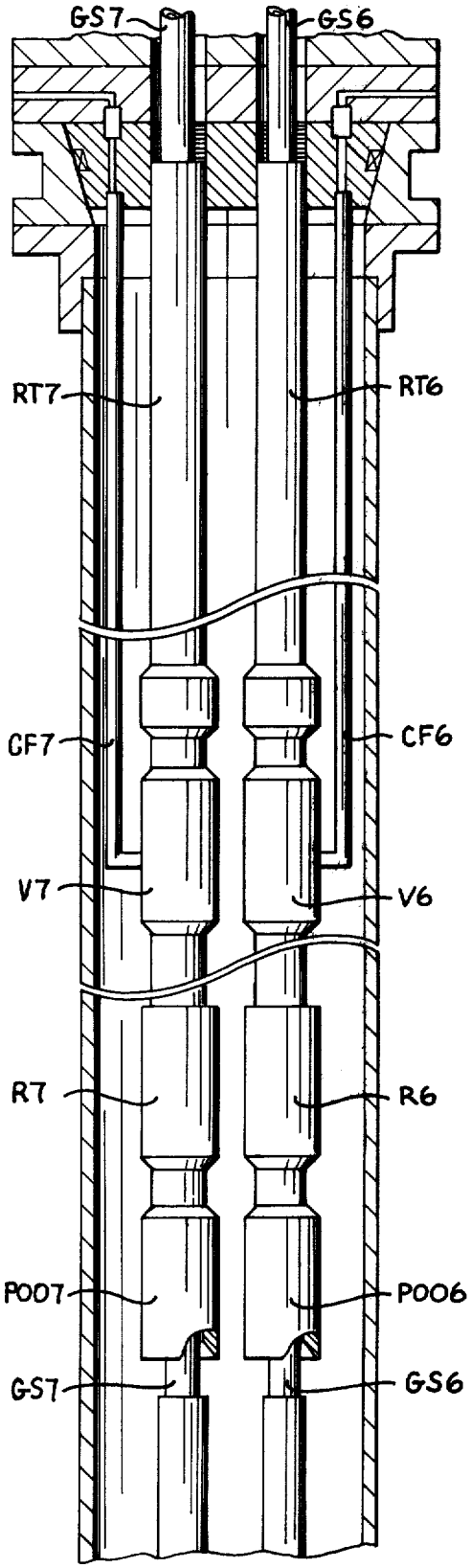
Figure 33:
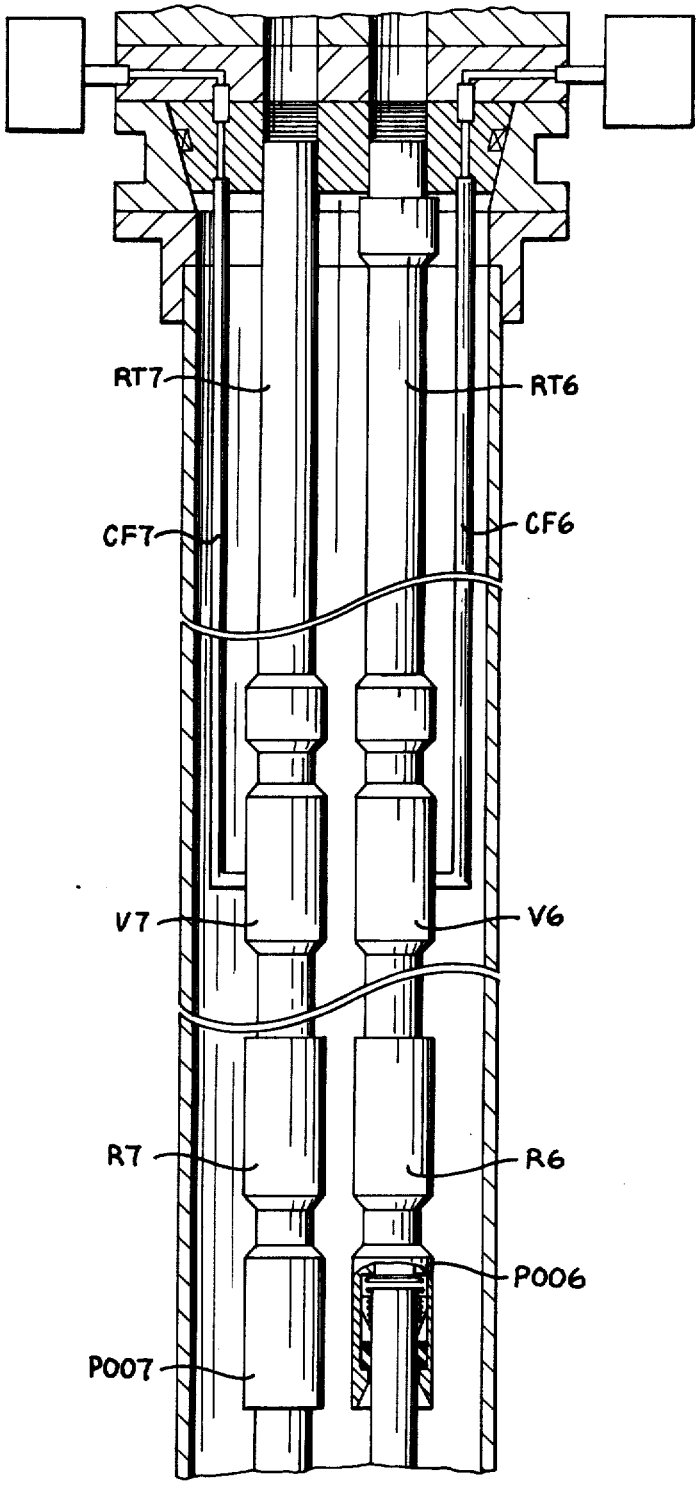
Figure 35:
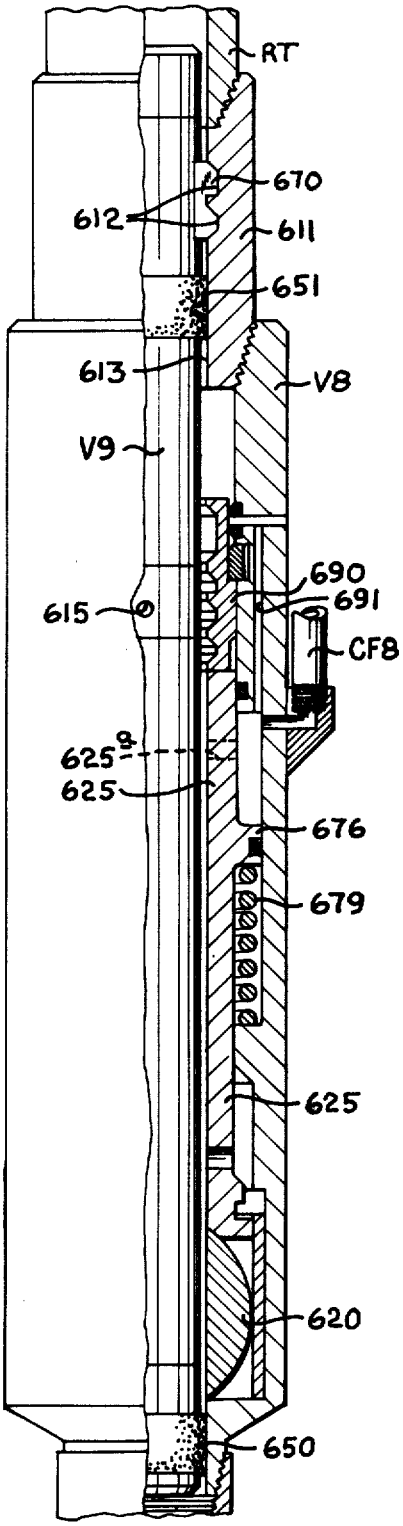
Figure 36:
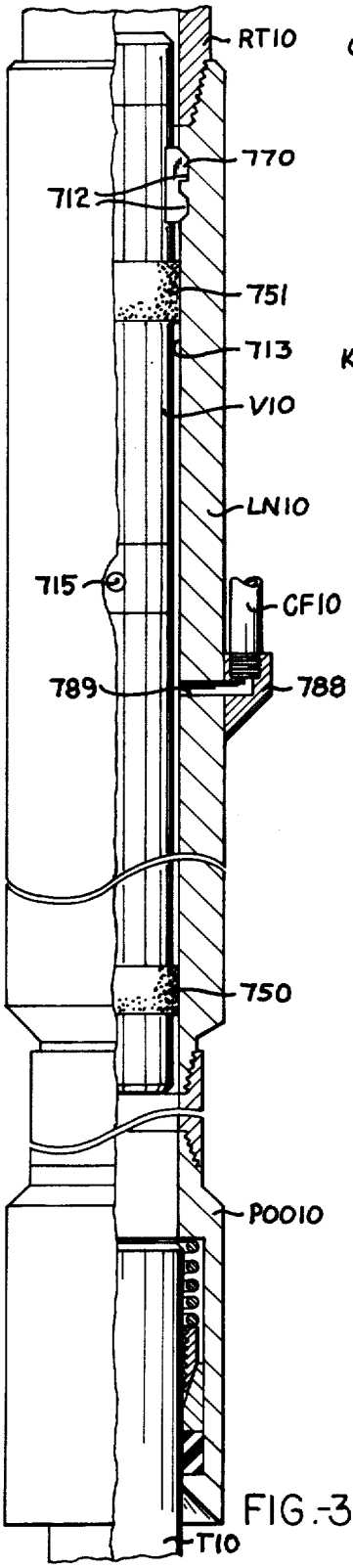
Figure 34:
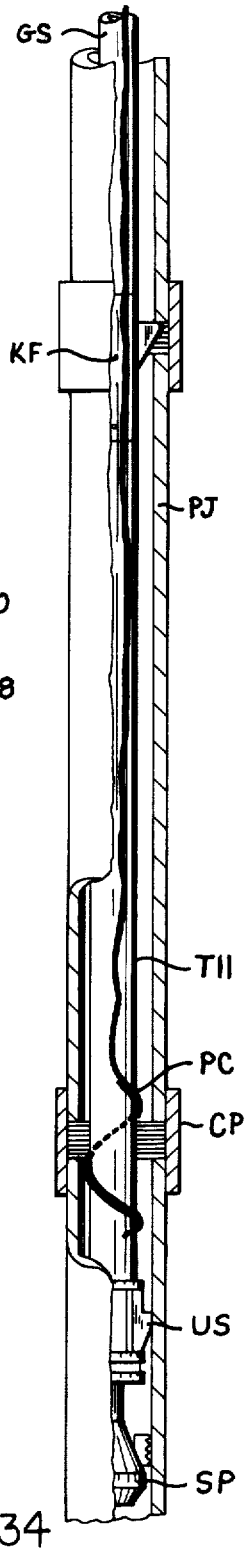

FIGS. 18A, 18B, and 18C comprise a vertical sectional view of the hanger taken on line 18—18 of FIG. 17;

FIG. 19 is a fragmentary view, partly in elevation and partly in section, of the valve mechanism of FIG. 13B taken at right angles to that of FIG. 13B showing the valve closure moved to closed position;

FIGS. 20A and 20B are longitudinal vertical views, partly in elevation and partly in section, showing the downshift tool engaged with the sliding locking sleeve of FIG. 15B to shift the same downwardly for releasing the latching mechanism for removal of the safety valve and latching mechanism with the replacement upper flow conductor portion thereabove;

FIG. 21 is a view similar to FIG. 1, in which the flow conductors are made up of coupled sections of tubing rather than integral joint pipe as in FIG. 1, and wherein the diameter of the couplings in the tubing strings is so large as to prevent the use of an overshot tubing hanger in the same manner as in FIGS. 1 through 11, showing the well before the installation of surface controlled subsurface safety valve equipment therein;

FIG. 22 is a fragmentary view similar to FIG. 21, with the Christmas tree and tubing hanger removed, showing a guide string having an anchoring spear and cutter device connected to the lower end thereof inserted into each of the flow conductors and engaged therewith for cutting off the conductors at a desired location in the well;

FIG. 23 is a fragmentary view similar to FIG. 22 showing the upper portions of the flow conductors parted from the remainder thereof above the spears which hold the guide strings connected in the respective flow conductors therebelow;

FIG. 24 is a fragmentary view similar to FIG. 23 showing the separated upper portions of the flow conductors removed from the well by having been stripped off over the guide strings;

FIG. 25 is a fragmentary view similar to FIG. 24 showing a milling tool and actuating string telescoped over one of the guide strings for milling the upper end of the flow conductor to which the guide string is connected;

FIG. 26 is a fragmentary view similar to FIG. 25 showing an overshot hanger being lowered into place over the upper ends of the flow conductors left in place in the well and being guided into the proper position by the guide strings;

FIG. 27 is a fragmentary view similar to FIG. 26 showing the overshot hanger anchored in place in supporting engagement with the casing and the upper ends of the flow conductors left in place in the well;

FIG. 28 is a schematic view similar to FIG. 21 showing the replacement upper flow conductor portion, surface controlled subsurface safety valve, and packoff overshot for each of the flow conductors being lowered into the well over the guide strings connected the flow conductors left in place therein;

FIG. 29 is a view similar to FIG. 28 showing the replacement upper flow conductor portions latched in flow conducting communication to the upper ends of the flow conductors left in place in the well and connected at their upper ends to the tubing hanger and Christmas tree with the guide strings removed and the well in condition to produce;

FIG. 30 is a view similar to FIG. 22 showing a modified method of cutting the flow conductor by means of a chemical type tubing cutter for carrying out the method of this invention;

FIG. 31 is a view similar to FIG. 30 showing the guide strings inserted through each of the flow conductors and anchored in supporting engagement below the level of the cut made by the chemical type cutter, and the upper portions of the flow conductors lifted to part the same from the lower portions of the conductors to be left in the well, with the guide strings supporting the same;

FIG. 32 is a view similar to FIG. 29 showing a modified replacement upper flow conductor portion, safety valve, and packoff overshot in position for the upper ends of the flow conductors left in place in the well to be lifted by the guide strings into latched and sealed flow communication with their respective packoff overshots;

FIG. 33 is a view similar to FIG. 32 showing the upper ends of the flow conductors left in place in the well lifted into latched sealed flow communication with their respective packoff overshot, the guide strings removed, and the well in condition to produce;

FIG. 34 is fragmentary view, similar to FIG. 5, showing a further modified method of the invention;

FIG. 35 is a longitudinal vertical, partly in elevation and partly in section of a modified form of safety valve installation showing an original surface controlled safety valve such as is shown in FIGS. 13A through 13D, inclusive, having a supplementary safety valve disposed therein for controlling fluid flow from the well in the event of failure of the original safety valve to so function; and, FIG. 36 is a longitudinal vertical view, partly in elevation and partly in section, of a modified form of replacement upper flow conductor portion having a safety valve insertable into and removable from a landing nipple forming a part of said replacement upper flow conductor portion.

In FIG. 1 of the drawings is shown a multiple zone well installation having the usual casing C extending downwardly through two producing formations F1 and F2, respectively, and having perforations 11 and 12, respectively, communicating the bore of the casing with the producing formations. A long string of tubing T1 extends downwardly in the casing to a lower packer P1 which seals between said tubing and the casing between the upper and lower formations F1 and F2 to separate the formations and to direct the well fluids from the lower formation into the lower end of the tubing string T1. A short string of tubing T2 extends downwardly in the well to a position near the upper formation F1 and a multiple string packer P2 seals between the tubing strings T1 and T2 and the casing C above the upper formation F1 in the usual manner to isolate the upper formation from the casing annulus above the packer and direct flow from the upper formation into the lower end of the short tubing string T2. The upper end of the short tubing string T2 is connected in the usual manner to a tubing hanger H which is supported and seated in sealing relationship in the bore of a tubing head B in the usual manner above a casing head X which has a lateral flowing wing X1 and valve X2 connected therewith in the usual manner. The long tubing string T1 has a slip joint J at its upper end between the tubing hanger H and the tubing string and a short sleeve is supported by the tubing hanger H and connected to the upper end of the tubing string T1 in sealing relationship therewith in the usual manner. This slip joint which permits the upper end of the tubing string T1 to be connected with the supported by the tubing hanger H after the short tubing string T2 has been connected thereto, as is well known, could as well be connected in the short tubing string rather than the long tubing string, or both such strings, if desired.

The tubing strings shown are of the integral joint type such as the well known "Hydril" Integral Joint Tubing.

Above the tubing head B, the usual Christmas tree fittings V are connected, including gate valves V1 and V2 communicating and controlling flow through the tubing strings T1 and T2, respectively. The usual flow lines, flow wings and pressure gauges are connected above the gate valves for receiving, controlling and directing flow from the valves in the conventional manner and form the Christmas tree which is designated generally as A, and may be a dual type tree for the usual construction and assemblage, for controlling flow from the two formations through the two tubing strings separately.

It is also usual to have receptacles L1 and L2 connected in the tubing strings T1 and T2, respectively, for seating removable closing plugs therein when desired to service the well. These may take the form of the usual landing nipples for wire line or through the flow line pump-down system operated plugs having anchoring devices for latching and sealing the same in the landing nipples to close off flow through the tubing strings.

Figure 2:
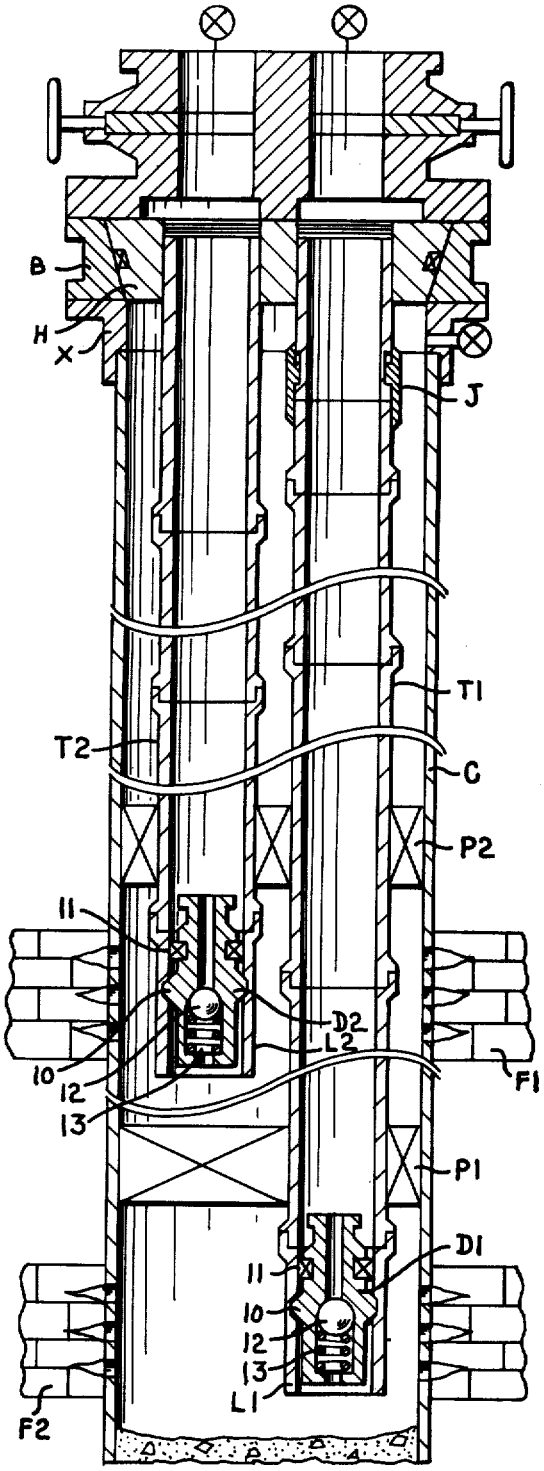
FIG. 2 is a view similar to FIG. 1 showing removable flow conductor plugs installed in receptacles in the lower portions of the flow conductors for closing off communication of the well producing formations with the surface of the well to permit carrying out the method of the invention.
Figure 3:
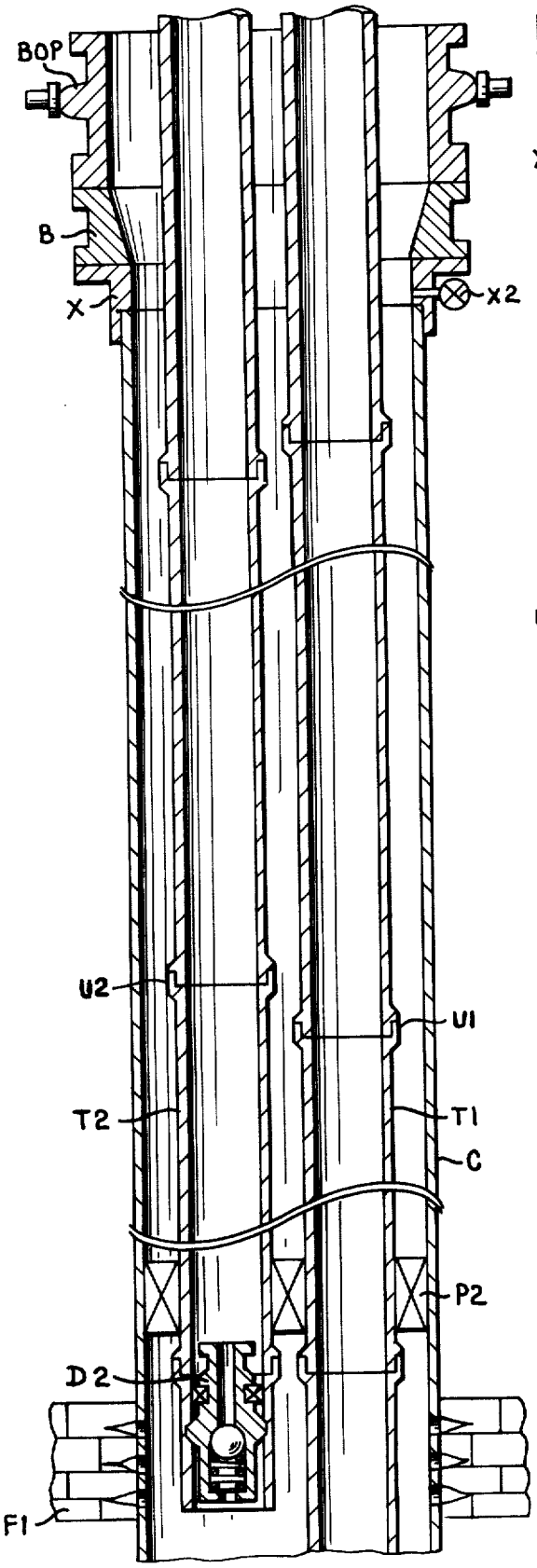
FIG. 3 is a view similar to FIG. 2 showing the Christmas tree and fittings connected therewith removed from above the hanger at the upper end of the well casing and a blowout preventer connected with the hanger for sealing between the casing and the upper ends of the flow conductors extending upwardly through the casing to the surface.

As shown in FIG. 2, the well installation is prepared for carrying out the method and installing the system of this invention by inserting wire line or through the flow line pump-down operated plugs D1 and D2 which have anchoring or locking means 10 and seal means 11 thereon engageable in anchoring sealing position in the landing nipples or receptacles L1 and L2, respectively, and which are provided with normally closed plug valves 12 which are biased to the closed position by springs 13. These removable plugs are inserted in the landing nipples or receptacles L1 and L2 to close off the producing formations from entry of well fluids into the tubing strings. Thus, when the plugs are installed as shown in FIG. 2, and the pressure thereabove is bled off, all well fluid pressure is excluded from the tubing strings above the packers and from the annulus and tubing head B thereabove. Therefore, no well fluid pressure is present above the upper packer P2 and the Christmas tree A and the master valves V1 and V2 may be removed from the upper end of the tubing head B as shown in FIG. 3 and replaced by a blowout preventer BOP, which will seal between the tubing head B and the two strings of pipe extending therethrough, in the usual manner. When this step has been completed the well is in the condition shown in FIG. 3 and is ready for the next step of the method.

Figure 4:
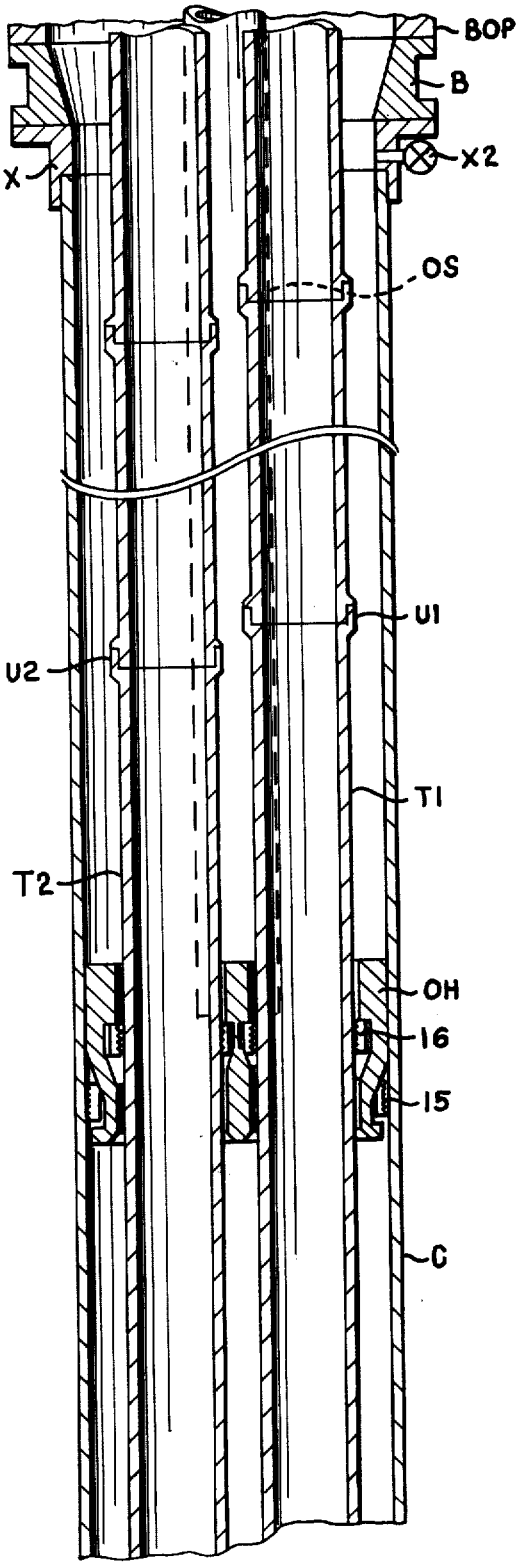
FIG. 4 is a view similar to FIG. 3 showing an overshot hanger and handling string therefor moved into place in the well casing to a point below the point at which the flow conductors are to be separated for later installation of the surface controlled subsurface safety valve.

As shown in FIG. 4, the tubing hanger H is thereafter removed from the tubing head B, the slip joint J disconnected from the upper end of the tubing string T1, and a joint of the usual tubing connected therein. After the tubing hanger has been removed and the slip joint detached and the new joint of tubing has been connected to the upper end of the tubing string T1, an overshot type hanger OH supported by an operating string OS is inserted in the casing, telescoping over the two strings of tubing T1 and T2 as it is moved downwardly in the casing to a position below the location at which it is desired to install a surface controlled subsurface safety valve in each of the two strings of tubing.

As shown in FIG. 4, the overshot hanger OH is lowered to a position below the threaded joints U1 and U2 of the tubing strings T1 and T2, respectively, so that the hanger will engage the exterior of the tubing strings below the slight upsets in the pipe at the joints and to assure that the upper ends of the pipe from which the tubing thereabove is to be disconnected are positioned above the hanger and accessible for later operations. Thus, the overshot hanger will engage the body of the tubing string rather than the upsets U1 and U2 at the joint. The external gripping members 15 and the internal gripping members 16 of the hanger are expanded into gripping engagement with the casing and the tubing strings, respectively, by hydraulic fluid pressure conducted down the operating string OS and applied to suitable operating pistons (not shown) in the overshot hanger, as will be hereinafter more fully explained. When the gripping members 15 and 16 are so engaged, the tubing strings T1 and T2 below the hanger are supported by the hanger against downward movement then the sections of the tubing strings above the joints U1 and U2 are removed, as will now be explained.

The strings of tubing T1 and T2 are supported at the surface to maintain the same in the proper tension while the tubing hanger H is being removed and during running and setting of the overshot hanger OH. When the overshot hanger is set, the tubing is supported in the proper tension therebelow and the upper sections of the strings above the hanger may be removed without affecting the setting of the hanger, the packers, or condition of the tubing string below the hanger. This is important where it is necessary or desirable to avoid setting the weight of the tubing strings on the packers in the well and so to avoid damaging the casing or packer seals, and the like, in place in the well.

After the overshot hanger has been anchored in supporting engagement in the casing and is gripping the tubing strings T1 and T2, as has just been described, any suitable method of disconnecting the tubing string above the joints U1 and U2 is employed to release the one or more joints of pipe above the joints U1 and U2 for removal from the well for carrying out the method and installing the protective system of the invention. The means illustrated in FIG. 5 in an explosive charge or string shot which is lowered by a wire line mechanism into each of the tubing strings and exploded at the location of the joints while a left hand or unscrewing torque is applied to the sections of pipe thereabove to loosen the joints U1 and U2.

As shown in FIG. 5, an explosive charge E1 such as Primacord is lowered into the well by a suitable electrical conductor cable 19 to a position immediately adjacent the coupling or joint U1 in the tubing string T1. The upper joints of the tubing string above the coupling U1 then have a left hand or unscrewing torque applied thereto, while the joint engaged by the overshot hanger OH is held thereby against rotation. With the torque applied to the joints above the joint U1 the charge E1 is exploded, and the shock or jar impressed on the tubing string at the joint will loosen the thread for unscrewing the joints of pipe above the joint U1 out of the box of the joint therebelow. This explosive effect, plus the torque applied to the tubing string thereabove, permits the loosening of the threaded joint. However, the joint is not disconnected at this time, for reasons to be explained hereinafter.

Subsequent to releasing or loosening the joint U1, an explosive charge E2 is lowered into the tubing string T2 adjacent the joint U2 and exploded in the same manner while a left hand or unscrewing torque is applied to the string of tubing above the joint U2. The loosened string above the joint is not disconnected from the tubing string T2 until later, as will be hereinafter explained. After the two joints have been loosened and are ready to be disconnected, the electrical conductor cable 19 is removed from the well with any remainder of the explosive device, in the usual manner.

Figure 6:
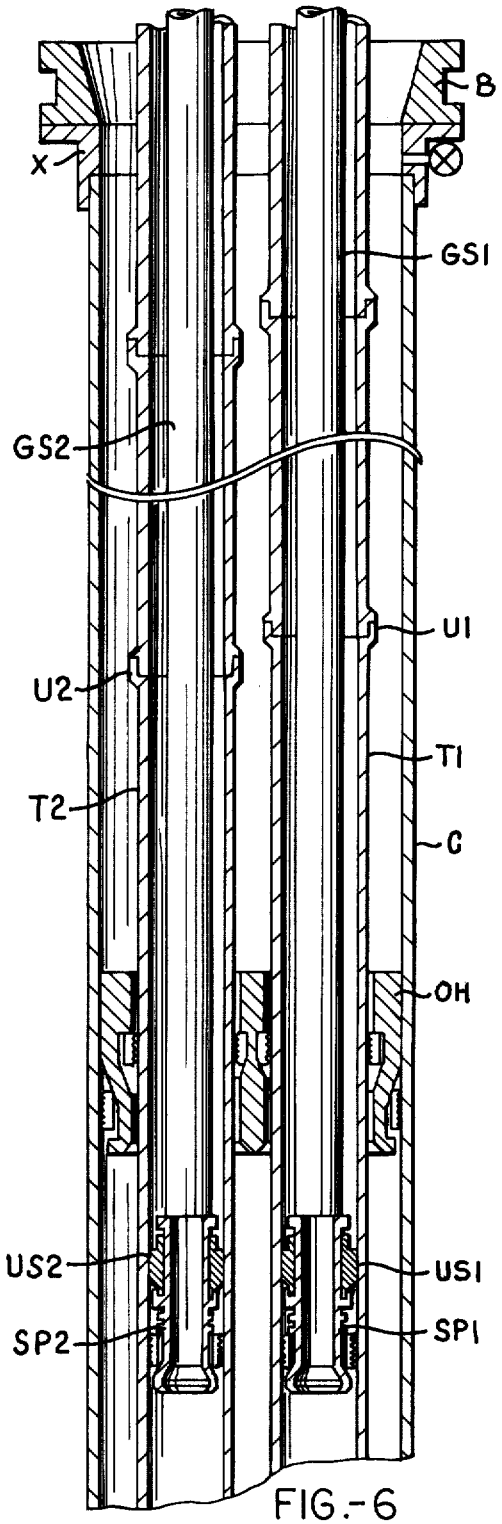
FIG. 6 is a view similar to FIG. 3 showing guide strings lowered through the flow conductors into anchored engagement with the conductors below the point at which the flow conductors are to be parted.

After the joints have been loosened, a guide string GS1, having a spear or gripping device SP1 and an upshifting tool US1 connected to the lower end thereof, is lowered through the tubing string T1 to a point below the joint U1. As shown in FIG. 6, the spear and upshifting tool are engaged with the bore wall of the tubing string T1 below the overshot hanger OH, but may be engaged at any suitable point below the joint U1 of the tubing string T1 supported by the overshot hanger.

Similarly, a guide string GS2 is lowered into the tubing string T2 in the same manner as the guide string GS1, and this guide string also has a spear or gripping device SP2 and upshifting tool US2 connected to its lower end, and the spear is engaged with the wall of the tubing string T2 below the joint U2, also shown in FIG. 6 to be below the overshot hanger OH, though it may be engaged at any point below the joint U2.

With the guide strings in place, a slight upward force is applied to the guide strings to place the guide strings under tension. The tubing strings T1 and T2 above the joints U1 and U2 are then rotated in a direction to back the lower ends of such tubing strings out of the loosened joints U1 and U2, and such tubing strings above the joints U1 and U2 are then stripped off over the guide strings and removed from the well leaving the guide strings GS1 and GS2 anchored to the tubing strings T1 and T2, respectively, as shown in FIG. 7, and the overshot hanger OH engaged with the casing and the tubing strings T1 and T2 as shown in FIG. 7.

Figure 7:
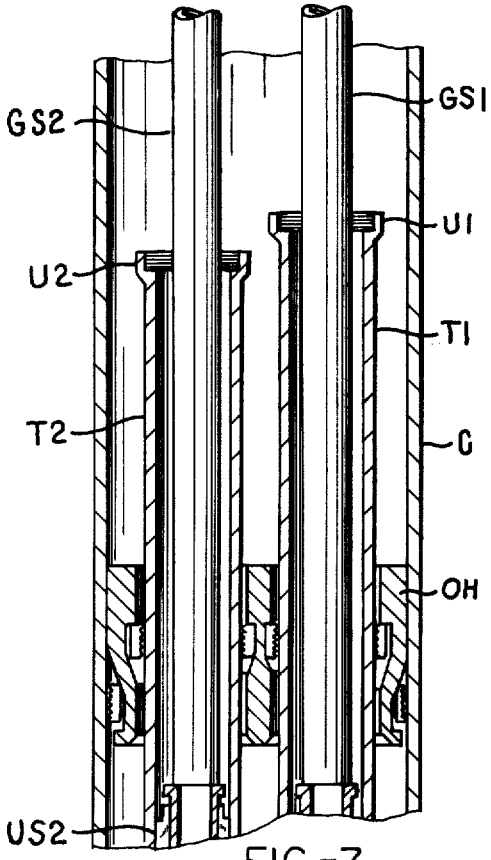
FIG. 7 is a fragmentary view similar to FIG. 6 showing the upper ends of the flow conductors supported by the overshot hanger after the upper portions of the flow conductors have been disconnected and removed from the well leaving the guide strings anchored in place.
Figure 8:
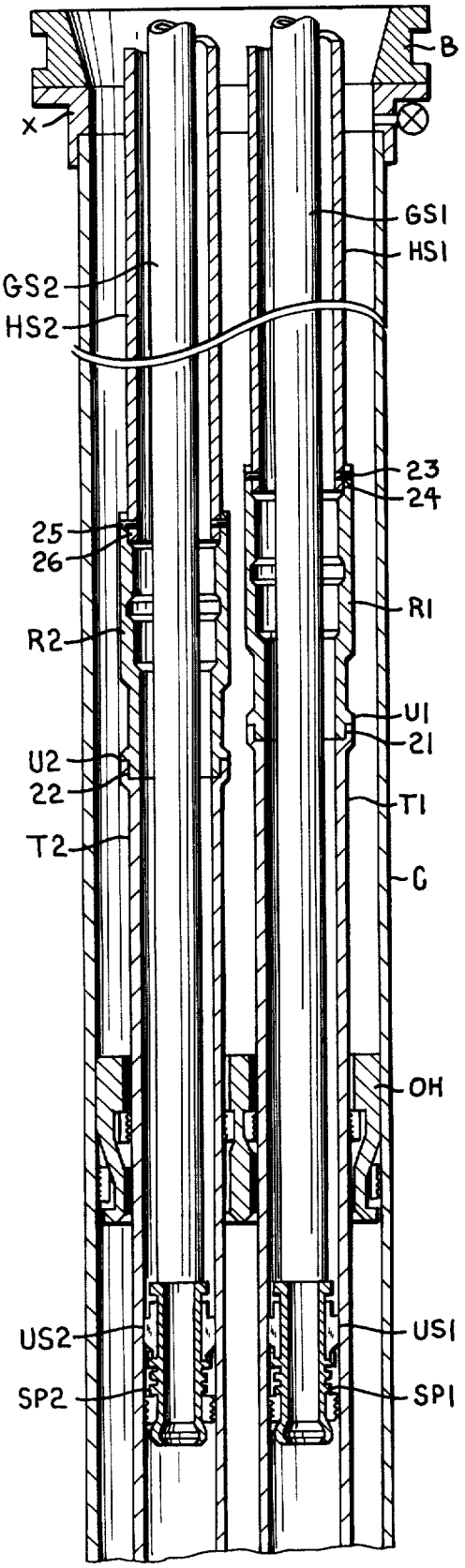
FIG. 8 is a view similar to FIG. 6 showing handling strings, each having a receptacle for a subsurface safety valve connected at its lower end, inserted into the well over the guide strings and threaded into the upper end of the corresponding flow conductors supported by the overshot hanger.

When the well has been serviced to remove the upper sections of the tubing strings, as shown in FIG. 7, a receptacle R1 is connected to the lower end of a handling string HS1 and lowered over the guide string GS1 into the well until the threaded lower end 21 of the receptacle is engaged in the threaded box member of the joint U1 of the tubing string T1. The handling string is then rotated to thread the pin at the lower end of the receptacle R1 into fluid tight engagement with the threads of the box member of the joint U1 at the upper end of the tubing string T1.

Similarly, a handling string HS2, having a receptacle R2 connected to its lower end, is telescoped over the guide string GS2 and lowered into the well until the threads 22 at the lower end of the receptacle are engaged with and made up in fluid tight sealing engagement with the box member of the joint U2 at the upper end of the tubing string T2 by rotating the handling string HS2.

Figure 9:
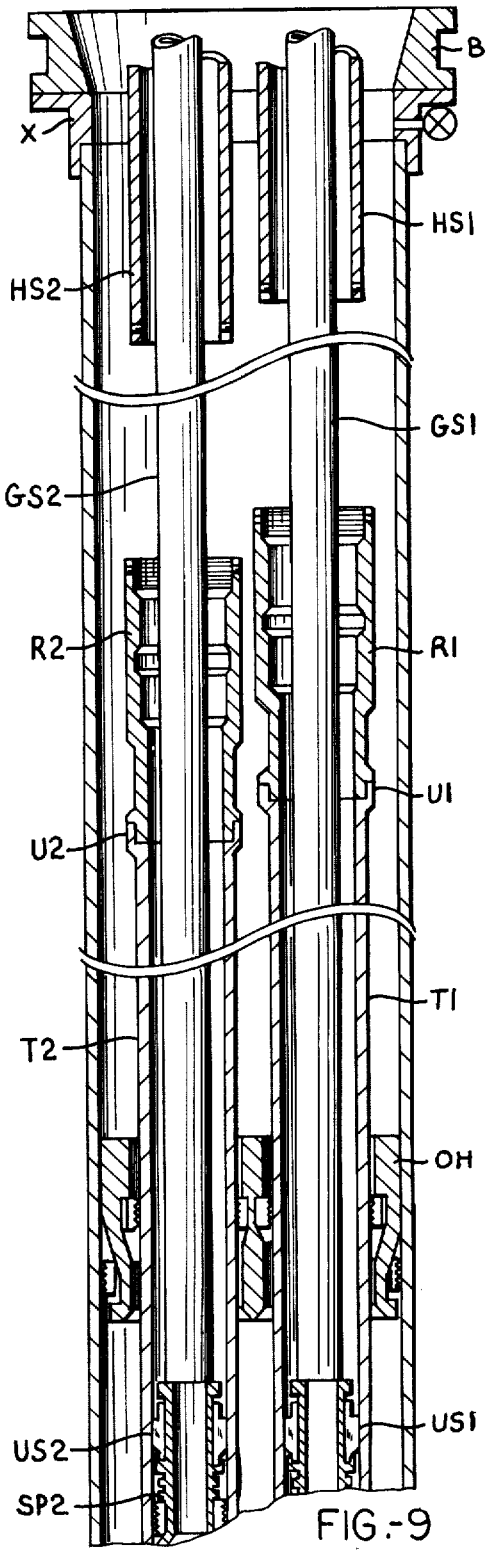
FIG. 9 is a view similar to FIG. 8 showing the handling strings for the receptacle released from connection with the upper ends thereof and being removed from the well.

After the receptacles R1 and R2 have been securely connected to the tubing strings T1 and T2, respectively, the handling strings HS1 is further rotated in the same right hand direction to shear the pins 23 release the left hand threaded back-off connection 24 at the lower end of the handling string HS1 from engagement with the threaded upper end of the receptacle R1 to disconnect the handling string HS1 from the receptacle R1, after which the handling string may be stripped upwardly out of the well over the guide strings GS1, as shown in FIG. 9.

Similarly, after the receptacle R2 has been suitably engaged with the box member of the joint U2 of the tubing string T2, the handling string HS2 is further rotated in the same right hand direction to shear the pin 25 and release the left hand threaded back-off connection 26 on the lower end of the handling string HS2 from the threads in the upper end of the bore of the receptacle R2. The shear pins 23 and 25 are sheared before the left hand threaded back-off connections 24 and 26 are operable to disconnect the handling strings from the receptacles R1 and R2, respectively. Obviously, the receptacles R1 and R2 may be lowered into the well and connected to the upper ends of the tubing strings T1 and T2, respectively, utilizing a common handling string for inserting and connecting each of the receptacles to its respective tubing string.

Once the handling strings have been disconnected from the receptacles and lifted out of the well over the guide strings, the receptacles are in position to receive the surface controlled subsurface safety valve latching mechanism as will now be explained.

Figure 10:
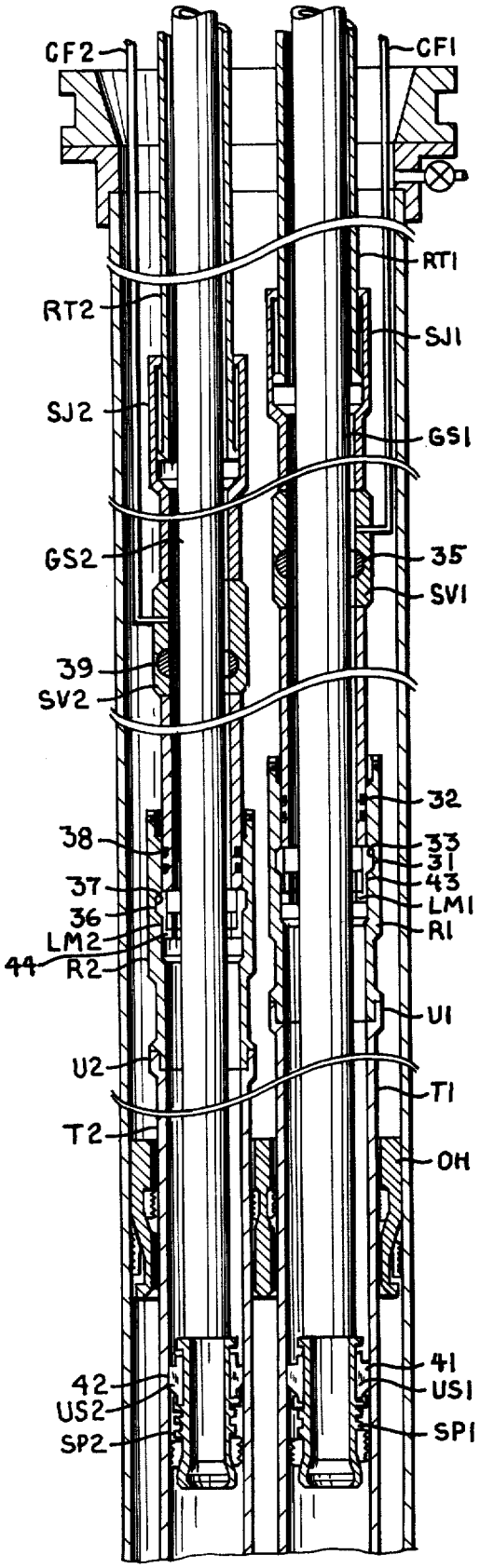
FIG. 10 is a view similar to FIG. 9 showing the handling strings removed and replacement upper flow conductor portions, each having a surface controlled subsurface safety valve and control fluid line connected thereto, anchored in the receptacles connected to the upper ends of the flow conductors in place in the well.

After the handling strings HS1 and HS2 have been removed from the well, leaving the guide strings GS1 and GS2 engaged with the tubing strings T1 and T2, respectively, a replacement tubing string RT1, having a surface controlled subsurface safety valve SV1 and latching mechanism LM1 connected to its lower end, is telescoped over the guide string GS1 and lowered until the latching mechanism LM1 is engaged in the receptacle R1 as shown in FIG. 10. A control fluid line CF1 is connected to the safety valve SV1 and extends upwardly exteriorly of the replacement tubing string RT1 to the surface, where it will be connected as will be hereinafter more fully explained to an exit fitting. The latching mechanism LM1 has locking dogs 31 and seal elements 32 thereon which engage in locking recesses 33 and seal against the bore wall of the receptacle R1 to secure the safety valve SV1 in flow communication with the tubing string therebelow. As will be explained, the closure member 35 of the safety valve SV1 is held in open position by fluid pressure exerted through the control fluid line CF1 while the replacement tubing string RT1 and the safety valve SV1 and latching mechanism LM1 are lowered over the guide string GS1 into the receptacle R1, though the latching mechanism LM1 has not been moved to latching position.

A suitable type telescoping or slip joint connection or member SJ1 is connected in the replacement tubing string RT1 above the safety valve SV1 for facilitating connection of the replacement tubing string with the tubing hanger H and the flow connections and Christmas tree thereabove, when the well is recompleted in the usual manner.

In the same manner, a replacement tubing string RT2, having the telescoping or slip joint SJ2 and safety valve SV2 with a latching mechanism LM2 connected therewith at its lower end, is telescoped over the guide string GS2 and the latching mechanism lowered into position to be latched in the receptacle R2 as shown in FIG. 10. The latching mechanism LM2 has locking dogs 36 expandable into a locking recess 37 in the receptacle R2 and seal members 38 for sealing between the latching member and the bore of the receptacle R2 to connect the safety valve SV2 in flow communication with the receptacle R2 and the tubing string T2 therebelow. The valve closure member 39 of the safety valve SV2 is held in the open position by control fluid pressure applied through the control fluid line CF2 while the device is being lowered over the guide string to position the latching member LM2 in the receptacle R2.

The telescoping or slip joints SJ1 and SJ2 connected in the replacement tubing strings RT1 and RT2 above the safety valves SV1 and SV2 permit the replacement tubing strings to be connected to the tubing hanger H without affecting the position of the safety valves and the latches in the receptacles, or the tubing strings T1 and T2 therebelow.

Before connecting the replacement tubing strings RT1 and RT2 to the tubing hanger H, th string, the safety valve and latching mechanism are lowered into position to be latched in the receptacles and the upper ends of the replacement tubing strings and control fluid lines are marked for cutting off and fitting them preparatory to connecting them to the tubing hanger H and the exit flange or bushing XF, as will be hereinafter more fully explained.

After the replacement tubing tubing strings RT1 and RT2 have been connected to the hanger H, and the control fluid lines CF1 and CF2 have been connected to the exit flange XF, the hanger is secured in sealed position in the tubing head B. The exit flange XF is similarly secured in sealing position on the tubing head and is connected with the sources of supply of control fluid CFP1 and CFP2 by means of the control fluid lines CF1 and CF2. Test fluid pressure may then be applied to the bore of the replacement tubing strings through the Christmas tree which has been secured to the upper end of the exit flange and tubing head between the guide strings GS1 and GS2 and the replacement tubing strings to determine that the installation is connected in proper sealing condition in communication with the tubing strings T1 and T2 therebelow, and that the tubing hanger H and exit flange XF are in sealing with the replacement tubing strings and the control fluid lines. Test fluid pressure may also be introduced through the casing valve X2 into the annulus between the casing and the tubing strings for applying fluid pressure exteriorly of the tubing strings to test the hanger and the connections of the safety valve and latching mechanism with the receptacle and tubing strings connected therewith.

After the connections have been tested by applying the test fluid pressure in the annulus between the replacement tubing strings and the guide strings GS1 and GS2, the spears SP1 and SP2, respectively, at the lower ends of such guide strings are released from latching position by shearing or otherwise releasing the same to permit the guide strings to be moved upwardly with respect to the latching mechanisms. Such upward movement lifts the upshifting tools US1 and US2 on such guide strings upwardly through the tubing strings T1 and T2 to engage the shifting keys 41 and 42, respectively, of such shifting tools with the shiftable locking sleeves 43 and 44 of the latching mechanisms LM1 and LM2, respectively, to move the locking sleeves upwardly to positively hold the locking dogs 31 and 36 in the recesses 33 and 37 of the receptacles R1 and R2, respectively, and so positively anchor the latching mechanisms and the safety valves in connected flow communication with the receptacles and the tubing strings therebelow. Thus, well fluids may flow upwardly through the tubing strings, the latching mechanism and the safety valves to the replacement tubing strings and through such replacement tubing strings to the Christmas tree connections at the upper end of the well.

After the locking sleeves of the latching mechanisms have been shifted to locking positing, the shifting keys 41 and 42 are moved to retracted position by a further upward pull on the guide strings GS1 and GS2, as will be hereinafter more fully explained, and the guide strings, the shifting tools and the spears may be removed from the well.

Figure 11:
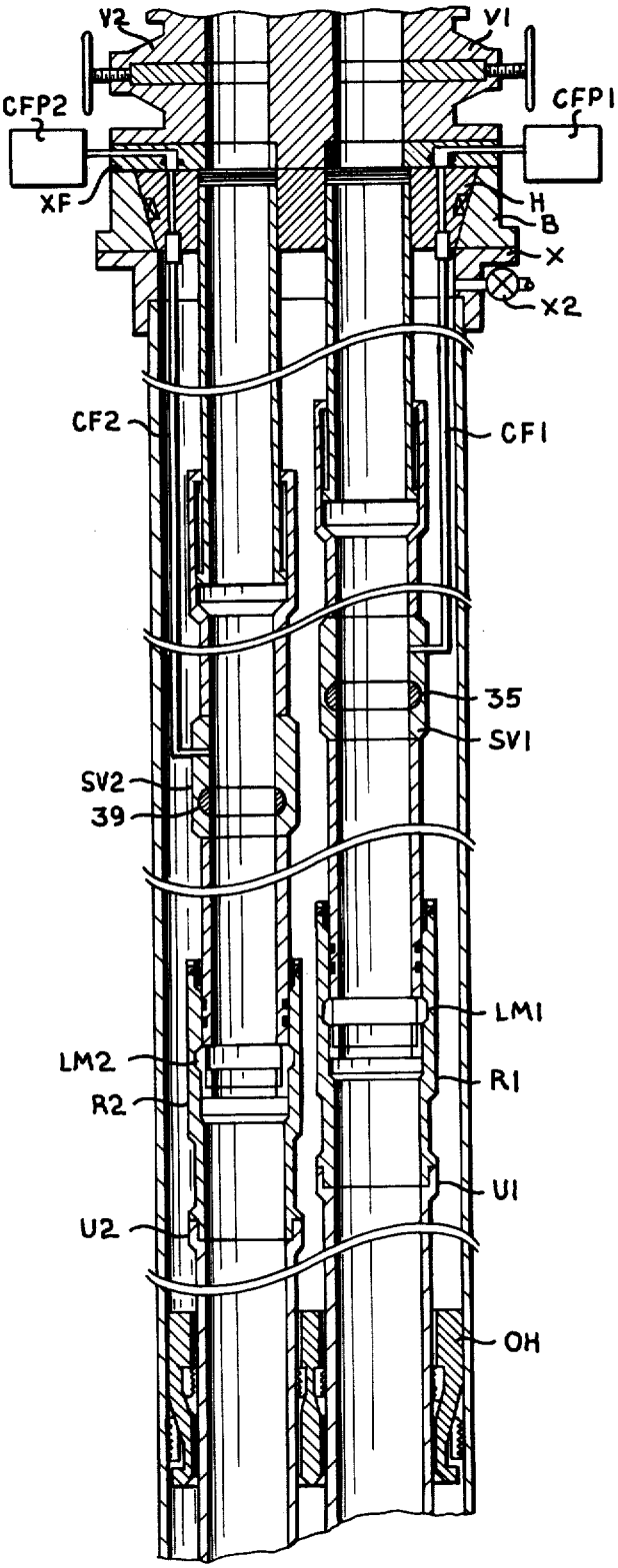
FIG. 11 is a view similar to FIG. 10 showing the upper ends of the replacement upper flow conductor portions connected to the tubing hanger and Christmas tree in flow controlling condition, with the guide strings removed and the well in condition to produce.

After the guide strings have been removed, the Christmas tree connections, including the gate valves V1 and V2 and the other appurtenances, are connected to the well above the exit flange SF, and the well is then in condition illustrated in FIG. 11 and ready for production in the usual manner.

So long as control fluid is supplied to the safety valves SV1 and SV2 from the control fluid pressure sources CFP1 and CFP2 through the control fluids lines CF1 and CF2, respectively, the closure members 35 and 39 of the safety valves are held in the open position. The plugs D1 and D2 have been removed in the usual manner from the landing nipples L1 and L2 by conventional wire line or pump-down tools in the usual manner leaving the tubing strings open for communication with the formations F1 and F2, respectively. Well fluids may then flow upwardly through the tubing strings, safety valves, and replacement tubing strings so long as the safety valve closure members are held in the open position.

Should any condition occur which would act to reduce or release control fluid pressure present in either of the control fluid lines CF1 or CF2, the safety valve SV1 or SV2 to which that control fluid line is connected, would close automatically as a result of such reduction or release of such control fluid pressure. Either of the valves may close independently or both may close simultaneously, and when closed, will shut off further flow of well fluids through the tubing string in which such closed valve is connected. Obviously, the control fluid pressure sources CFP1 and CFP2 may be separate individual sources or control fluid may be supplied from a common source. If desired, a manifold may be provided for supplying a common sensing and control valve connected to both the control fluid lines for releasing or reducing control fluid pressure in the lines upon the occurrence of any undesirable condition such as a fire or other catastrophe at the surface of the well. When the pressure in either or both of the control fluid lines is released or reduced sufficiently either or both of the valves will close automatically, as has been explained.

From the foregoing, it will be seen that a well having multiple strings of flow conducting tubing connected therein can be reworked to install surface controlled subsurface safety valves in the tubing strings below the surface of the well for controlling flow from the producing formations through the well.

When desired, the latching mechanisms LM1 and LM2 may be released by a down shifting tool DS lowered through the replacement tubing strings to engage and move the shiftable locking sleeves 43 and 44 downwardly to release the locking dogs 31 and 36 from locking engagement in the recesses 33 and 37 in the receptacles R1 and R2, respectively, to permit the safety valves and latching mechanisms to be pulled upwardly out of the receptacles to the surface for repair or replacement, as needed.

The method of carrying out this operation involves the reinsertion of the plug tools D1 and D2 in the landing nipples L1 and L2, respectively, in the tubing strings T1 and T2, bleeding off the pressure from within the tubing strings above the plug tools, then inserting the guide strings GS1 and GS2 with the spears and upshifting tools connected to the lower end thereof into anchored gripping engagement with the tubing strings T1 and T2, respectively, while the safety valves are open. Since the slidable locking sleeves have already been moved to the inoperative position to release the dogs, the replacement tubing strings RT1 and RT2 may be lifted to lift the safety valves and the latching mechanisms connected therewith upwardly out of the well over the guide strings GS1 and GS2 in the reverse manner to that in which they were installed.

After the valves and latching mechanisms have been repaired or replaced as desired, or as necessary, the same may be reinstalled and locked to their respective receptacles in the manner already described, and the well again placed on production.

Figure 12:
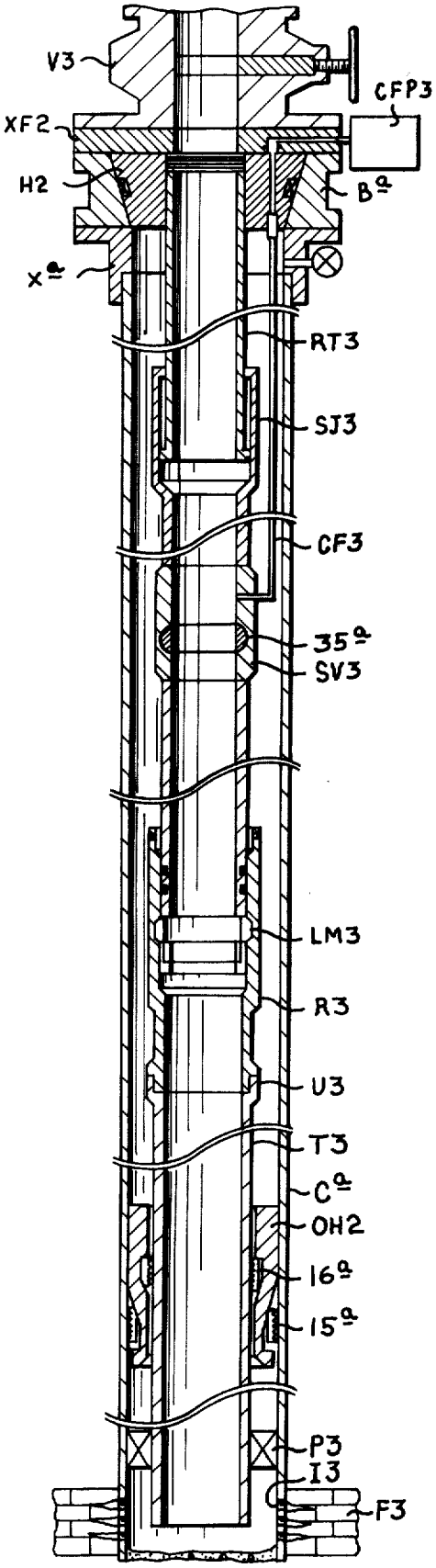
FIG. 12 is a view similar to FIG. 11 showing a surface controlled subsurface safety valve installation in a single zone well having a single flow conductor to the surface which has been completed in substantially the same manner as the multiple string installation of FIG. 11.

While the foregoing description of the method and apparatus for carrying out the method and controlling flow from the well has been directed to a multiple zone well installation, it is perfectly obvious that a single zone well may be similarly treated. Such an installation is shown in FIG. 12, wherein the tubing string T3 having a joint U3 therein is supported in a single string overshot hanger OH2. The overshot hanger has a single bore telescoped over the tubing string T3, with a single set of internal slips 16a gripping the tubing string and external slips 15a engaged with the casing, in the same manner as the multiple string overshot hanger OH of the form previously described was utilized for supporting the upper ends of the tubing strings T1 and T2 in the casing C.

The receptacle R3 is connected to the box member of the joint U3 of the tubing string T3 in the same manner as the receptacles R1 and R2 were connected to the tubing strings T1 and T2 of the form previously described. The replacement tubing string RT3 having the safety valve SV3 and latching mechanism LM3 connected to its lower end is lowered into the well and the latching mechanism is anchored in sealing flow communication with the receptacle R3. The slip joint SJ3 above the safety valve SV3 is connected in the replacement tubing string RT3 for facilitating connection of the upper end of the replacement tubing string to the tubing hanger H2. The control fluid line CF3 from the safety valve SV3 is connected to the hanger H and extends upwardly therethrough to a sealed opening in the exit flange XF2 to which the control fluid line supply CFP3 is connected in the same manner as the first form.

With the various elements of the safety valve, the latching mechanism, the control fluid line and the slip joints connected in the manner illustrated, the plug in the lower end of the tubing string T3 is removed and the well placed on production. Should any condition occur at the surface which would result in reducing or releasing the control fluid pressure in the control fluid line CF3, the valve closure 35a will move to the closed position, as will be hereinafter explained in connection with the details of the construction and operation of the valve.

Thus, a single string well may be equipped with a surface controlled subsurface safety valve in the same manner as the multiple string well already described, and placed in controlled production in the same manner without the necessity of killing the well, removing the tubing string and the packer, and recompleting the well. Instead, only the receptacle, the safety valve, the latch member and the replacement tubing string are installed above the overshot hanger and the well is then ready for production. In this form of the apparatus, as in the other, the latching mechanism and the safety valve SV3 may be removed for service or repair as desired and may then be replaced in the well in the same manner as the multiple string equipment was removed and installed. Thus all the advantages of the multiple string production well are provided in the single string production well of the form first described.

The safety valves SV1, SV2 and SV3 may be any desired type valve in which the closure member is moved between open and closed positions by a longitudinally movable actuator member in the valve. One satisfactory form of the device is illustrated and described in detail in U.S. Pat. application, Ser. No. 99,543, filed Dec. 12, 1970, by Donald F. Taylor, now U.S. Pat. No. 3,696,868 and is shown in FIGS. 13A through 13D, inclusive, wherein the valve V includes an elongate tubular housing 110 having internal threats 110a at its upper end into which the lower end of a landing nipple N is threaded. The landing nipple comprises a body 111 having a locking recess 112 consisting of a plurality of annular stop and locking grooves providing an upwardly facing stop shoulder therein in the same manner as that shown in the U.S. Pat. No. to Tamplen, 3,208,531, issued Sept. 28, 1965. Below the locking recess is a reduced bore providing a sealing surface 113 which is polished and adapted to receive and be engaged by seals on well tools anchored in the landing nipple as explained in that patent.

The lower end of the housing 110 of the valve is provided with a seat bushing or sub 115 which is welded or otherwide suitably secured to the housing and provides an upwardly facing internal concave seating surface 116 surrounding the bore 117 through the sub. A ball valve closure member 120 is movable in the enlarged bore of the valve section 124 of the housing 110 above the seat 116 and is adapted, when in its lower position, to engage said seat to position the closure member in an open position with its diametrical flow bore 121 in axial alignment with and communicating with the bore 117 of the sub. Since the valve may be identical to that shown in the U.S. Pat. to W. W. Dollison, No. 3,583,442, issued June 8, 1971, it will not be described in great detail. Other types of valves such as that shown in the U.S. Pat. to Fredd, No. 3,007,669, may also be used, if desired.

Above the ball valve closure 120 is an elongate tubular actuating sleeve 125 which is movable longitudinally in the housing or body 110 and is connected with an moves the ball valve closure member 120 longitudinally therewith. The valve closure member is operatively connected with the lower end of the actuating sleeve by means of a pair of connector links 127 each having a support pin 128 welded or otherwise suitably secured thereto and engaged in one of a pair of diametrically opposed recesses 129 formed in the ball and each receiving one of the pins 128. The upper end of each connector link 127 has an inwardly projecting flange or arm 130 which is engaged in an annular slot or groove 131 formed in the enlarged lower portion 132 of the actuator sleeve 125. The extreme lower portion 132a of the sleeve is still further enlarged below the annular groove, and this further enlarged portion is provided with a pair of diametrically opposed vertical cut-away guide slots 133, in each of which the longitudinal upper portions of one of the connector members 127 is disposed. The opposite sides of the ball closure member 120 surrounding the recesses 129 are flattened as at 135, and the lower portions of the connector members 127 are slidable on these flattened surfaces with the pins 128 engaged in the recesses 129 in the ball. A slidable operator or rotator sleeve 140 is disposed in the lower portion of the bore of the valve section 124 of the housing or body 110 and is slidable between a shoulder 143 on the lower end of a guide bushing 122 which is threaded into the upper end of the valve housing section 124 of the valve body and is welded or otherwise suitably secured at its upper end to the lower end of the spring housing section 123 of the valve body 110, for a purpose which will be hereinafter more fully explained.

A beveled seat shoulder or surface 150 is formed at the upper end of the enlarged portion 132 at the lower end of the actuating sleeve 125, and this seat shoulder engages a downwardly facing beveled seat 151 formed in the bore of the guide bushing 122, above the enlarged portion of the bore of said bushing therebelow and intermediate the ends of the bushing. When the actuating sleeve is in the upper position, the seat shoulder 150 engages the seat 151 to close off flow exteriorly of the actuating sleeve. When the sleeve is in the lower position shown in FIG. 13 B, the seat shoulder 150 is spaced below the seat 151 and fluids may flow past the enlarged lower portion 132 of the actuating sleeve, and the fluids so entering will flow upwardly then inwardly through a plurality of lateral equalizing ports 138 formed in the wall of the tubular actuating sleeve 125 above the seat shoulder 150 and into the bore 126 of the tubular sleeve.

When the sleeve is in the upper position, the equalizing ports are closed off from communication with the bore of the valve housing section 124 therebelow, and flow from below the seat 151 inwardly through such ports to the bore 126 of the sleeve is prevented.

The ball valve closure member 120 seats upon a hardened wear material seat surface 160 formed at the lower end of the bore 126 of the sleeve 125, and when the valve is in the upper closed position (FIG. 19), the valve closure member 120 is rotated to turn the diametrical bore 121 thereof out of communication with the bore 126 of the sleeve to close the seat 160 and no flow can take place in either direction through the housing and sleeve.

Guide pins 165 are each welded or otherwise suitably secured in an aperture formed in the rotator sleeve 140 on each side of the ball valve closure member 120 and engage one side of the adjacent connecting links 127. A similar pair of turning pins 170 are also secured by welding or the like to the rotator sleeve on the opposite side of the connector links 127 on each side of the closure member and, with the pins 165, maintain the positional relationship of the valve closure member and the connecting links during longitudinal movement of the valve closure member and the rotator sleeve. The guide pins 165 are sufficiently short that their inner ends will ride along the flattened surfaces 135 of the ball valve closure member as the ball valve and actuating sleeve move rotatably with respect to each other. The turning pins 170 engage in angularly disposed grooves or slots 175 formed in the exterior of the ball valve closure member on opposite sides of such closure member, and these turning pins engage the inclined surfaces of the angularly disposed slots to rotate the ball between open and closed positions when the ball is moved longitudinally with respect to the rotator sleeve 140 by the connector links 127 moved by the actuating sleeve 125.

As the rotator sleeve 140 is moved upwardly when the actuating sleeve 125 is moved upwardly, the upper end of the rotator sleeve engages the downwardly facing shoulder 143 in the bore of the housing 110 and further upward movement of the rotator sleeve is stopped. However, the elongate tubular actuating sleeve 125 may continue to move upwardly until the seat shoulder 150 engages the downwardly facing seat 151 in the bushing 122 forming a part of the housing or valve body 110. Such upward movement of the actuator sleeve lifts the connecting links 127 and also lifts the ball valve closure member 120 upwardly with respect to the rotor sleeve 140. Due to the engagement of the actuating or turning pins 170 and the slots 175 in the ball, the ball will be turned from the open position shown in FIG. 13B to its closed position (FIG. 19) during such upward movement.

As is explained in the patent to Dollison, the valve closure member is moved between open and closed positions under conditions of equalized pressure across the closure member, and the closure member is rotated or moved between such open and closed positions by longitudinal movement of the actuating sleeve 125 in the housing.

For moving the actuating sleeve 125 to cause rotation of the valve closure member, a piston 176 is formed on the exterior of the actuating sleeve 125 by means of an external annular flange formed integral with the actuating sleeve and provided with an external annular groove 177 in its mid-portion for receiving a seal ring 178 for sealing between the piston and the bore wall of the spring housing 123. A helical coiled spring 179 is confined between the lower end of the piston 176 and the upper end of the bushing 122 and this spring acts to bias the piston and the actuating sleeve upwardly in the housing to move the seat 150 into and out of engagement with the seat 151 and to rotate the valve closure member 120.

The upper end of the actuator sleeve 125 is slidable in the lower portion of the bore 182 of a latch section 183 forming the upper portion of the valve body 110. An internal annular seal ring 184 is disposed in an internal annular groove 185 formed in the lower portion of the bore 182 of the latch housing and seals around the upper end of the actuator sleeve above the piston 176. Thus, the bore 186 of the spring housing 123 between the lower end of the latch housing 183 and the piston forms an operating cylinder 186 into which control fluid may be conducted through an annular flow passage 187 in a boss 188 welded or otherwise suitably secured to the exterior of the spring housing 123 and having the control line L connected thereto for conducting control fluid pressure through the angular passage 187 into the chamber 186 for biasing the piston 176 downwardly against the spring 179 to move the actuating sleeve 125 downwardly to open the valve.

Thus, the valve is normally biased to a position in which the closure member closes off flow therethrough, but is placed into operation to permit flow by introducing control fluid through the control line L into the chamber 186 to act downwardly on the piston 176 to move the actuator sleeve 125 downwardly and cause the valve to be rotated to the open position shown in FIGS. 13A and 13B to permit flow therethrough until the actuating fluid or control fluid pressure is reduced for any reason, which may be controlled by various sensing apparatuses or devices at the surface, or which may be caused by the occurrence of some condition in the well system which has been sensed by various types of sensing devices connected in the system, such as pressure reducing systems, fire detecting systems, remote control systems, liquid level control systems, and sensing systems and the like.

Secured to the lower end of the safety valve V is the locking and sealing mechanism LM connected thereto by means of a coupling member 225 which is threaded onto the lower end of the valve housing 110 and the upper end of th latching mechanism. This latching mechanism is designed to be inserted into and lock and seal in the receptacle R which is threaded into the upwardly facing box member of the joint U of the tubing string T left in place in the well. The receptacle includes a housing 227 having an enlarged bore 228 above its reduced lower end 229. The enlarged bore has an internal annular downwardly facing stop shoulder 230 formed therein which is engaged by a locking flange for retaining the latching member L in place in the receptacle R, as will hereinafter be explained. The upper end of the bore of the housing 227 has coarse buttress type lefthand threads 231 formed therein which receive corresponding mating threads at the lower end of the handling string HS by means of which the receptacle is lowered into the well bore and threaded into the open box member of the connection or joint U of the tubing string in the manner already described. At least one suitable radial aperture 232 is provided for receiving a shear pin similar to the shear pin 23 to lock the handling string to the receptacle until it is desired to release and remove the handling string, as has already been described. This shear pin, as has already been explained, assures that the threaded lower reduced end of the receptacle R is made up in tight flow sealing communication with the box member of the joint U at the upper end of the tubing string T.

The latching mechanism LM includes an elongate upper seal mandrel section 235 having an external annular flange 236 at its upper end below the threaded pin 237 by means of which it is connected to the coupling 225 and the valve V thereabove. Spaced substantially below the external flange is a reduced lower exterior cylindrical sealing surface section 238 having a downwardly facing stop shoulder 239 at its upper end and threads 240 at its lower end. Between the threads and the shoulder are mounted a plurality of sealing ring assemblies 241, each of which may comprise an annular beveled central seal member ring 242 and a pair of retainer rings 243 which are molded, bonded or otherwise secured to the seal rings 242 for sealing between the mandrel 235 and the bore wall of the receptacle R above the locking shoulder 230 therein. It is believed readily apparent that the external annular flange 236 on the latching mechanism will engage the upper end of the receptacle R to stop downward movement of the latching member into the receptacle before the seal members reach the lower end of the internal sealing surface 228a in the base 228 above the locking shoulder 230, to prevent damage to the seal assembly.

Below the sealing mandrel section 235 is a latching mandrel section 245 which has an internal annular enlarged bore 246 at its upper end provided with internal threads which engage the threads 247 on the lower end of the sealing mandrel section, and an internal annular stop shoulder 248 which abuts the lower end of the sealing mandrel section 235 to form a seal therewith and limit movement of the upper end of the locking mandrel section 245 toward the seal assemblies 241. The upper end of the locking mandrel and the downwardly facing shoulder 239 on the seal mandrel section provide means for limiting movement of seal assemblies on the external seal surface portion 238 of the latching mandrel section and confine the seal assemblies thereon.

Below the upwardly facing shoulder 248 in the bore of the latching mandrel, the bore of the mandrel is enlarged by a downwardly and outwardly inclined bevel undercut 249, and a plurality of resilient collet latching members 250 are formed by a plurality of circumferentially spaced longitudinally extending slots 251 which define the lateral edges of the collet latching members. Exteriorly of each of the collet latching members is an external boss or lock member 252 having an upper beveled surface 253 which is adapted to engage the downwardly facing lock shoulder 230 in the bore of the receptacle R to hold the latching mechanism in place in the receptacle. The slots 251 extend downwardly a substantial distance below the locking bosses 252 and terminate above the lower end of the latching mandrel section which extends downwardly a substantial distance below the slots and is provided with internal threads 256 which receive the externally threaded upper end of a guide and retaining bushing 257 threaded into the lower end of the latching mandrel section.

Slidable within the lower enlarged bore of the latching mandrel section 245 is the locking sleeve 260, previously described as locking sleeves 43 and 44 in the description of the method of the invention. The locking sleeve 260 has at its upper end a cylindrical tubular locking section 261 having a bore 262 therethrough and a downwardly and outwardly inclined external shoulder 263 at its upper end adapted to engage the downwardly facing shoulder 249 in the bore of the latching mandrel section 245 when in its upward position. The locking section 261 is adapted to engage the inner surfaces of the resilient collet members 250 to hold the same in expanded position, so that the stop shoulders 253 on their bosses 252 will positively engage the downwardly facing lock shoulder 230 to prevent disengagement and withdrawal of the latching mechanism LM from the bore of the receptacle R, as has already been explained.

The lower portion of the bore of the locking sleeve 260 is enlarged to provide a downwardly facing shifting shoulder 264 by means of which the sleeve is shifted upwardly, as will be hereinafter further explained. Below the shoulder 264, the enlarged bore of the sleeve is slotted longitudinally, as at 265, at spaced points about its circumference to provide a plurality of resilient detent members 266 having detent bosses 267 on their external faces, which engage in a lower internal annular detent groove 270 to hold the locking sleeve in its lower inoperative position shown in FIG. 13C. The slots 265 permit the springing of the detent members 266 inwardly to permit the bosses 267 on the exterior thereof to move out to such lower internal annular detent groove 270 so that the locking sleeve 260 is movable upwardly from such lower inoperative position. The locking sleeve is then movable in the enlarged bore of the latching mandrel section to its upper operative position therein, and the bosses 267 engage in the upper internal annular detent groove 271 in such enlarged bore below the stop shoulder 249. In this position, the beveled shoulder 263 at the upper end of the locking section 261 is in substantial engagement with the stop shoulder 249 and the exterior surface of said locking section is disposed between the several spring collet members 250 to hold them in their expanded position shown in FIG. 13, so that the bosses are positively held in position to engage the downwardly facing lock shoulder 230 in the receptacle R.

Thus, when the locking sleeve 260 is in the lower position, the spring collet members 250 may spring inwardly to pass below the internal annular flange in the bore of the receptacle having the locking shoulder 230 at its lower end. However, when it is desired to lock the latching mechanism in place in the receptacle, the locking sleeve 260 is shifted upwardly, as will hereinafter be explained, to the position shown in FIG. 15B, in which the locking section is disposed between the collet members to positively hold the bosses 252 thereon in locking position to prevent removal of the latching mechanism LM from the receptacle R.

Figure 13C:
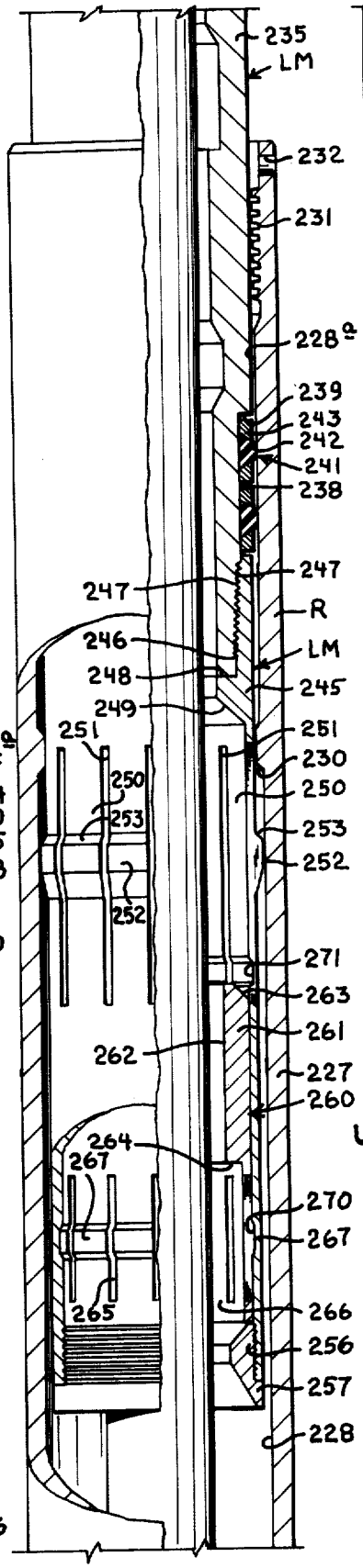
Figure 13D:
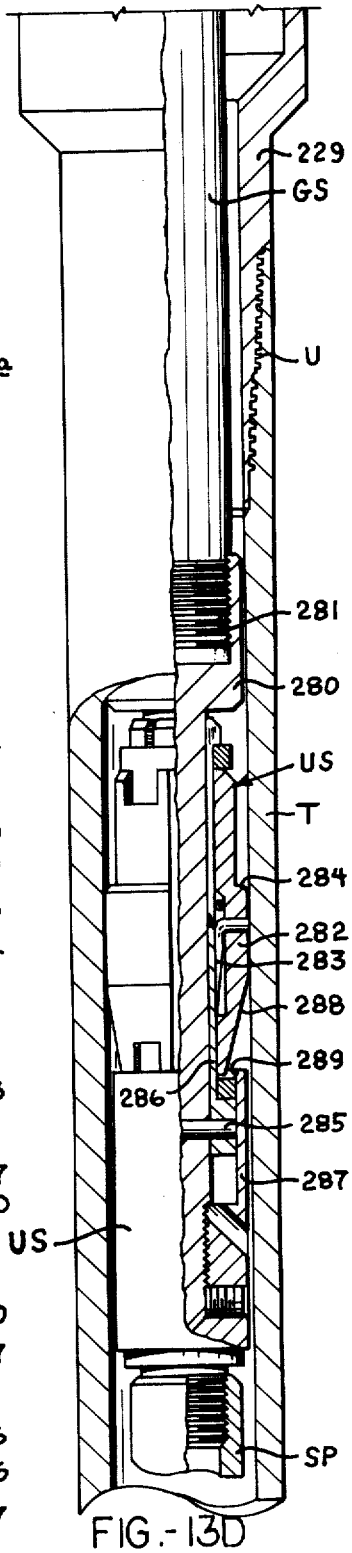
Figure 14:
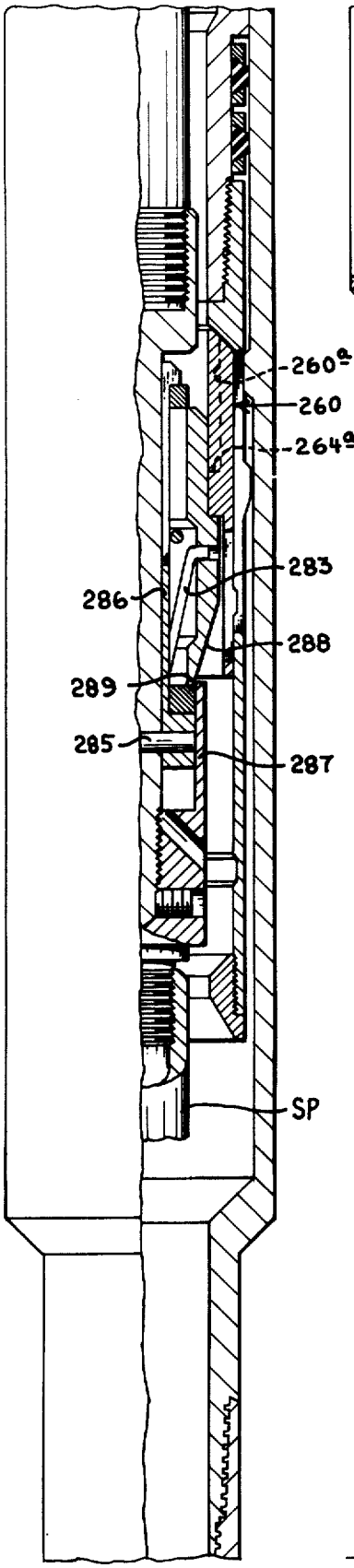
FIG. 14 is a fragmentary view, similar to FIG. 13, showing the guide string moved upwardly to shift the latching mechanism for the safety valve to anchored position in the receptacle prior to releasing the shifting tool from the latching mechanism.

For shifting the locking sleeve 260 from its lower position, shown in FIG. 13C, upwardly to the locking position, shown in FIG. 15B, the upshifting tool US is connected to the lower end of the guide string GS, as shown in FIG. 13B, and the spear SP is connected to the lower end of the upshifting tool. Any suitable upshifting tool may be utilized to engage the locking sleeve 260, but a shifting tool such as that illustrated in the U.S. Pat. to Grimmer et al., No. 3,051,243, dated Aug. 28, 1962, may be utilized. As clearly shown in the patent and in FIG. 13B, the shifting tool includes a mandrel 280 having a box 281 on its upper end threaded onto the lower end of the guide string GS. A pair of shifting keys 282, which have been described as keys 41 and 42 in the description of the method, are positioned on the reduced lower portion of the mandrel 280. These keys are biased outwardly toward engaging or shifting position by a spring 283 in the same manner as in the Grimmer et al patent, and the upwardly facing abrupt shoulder 284 on the exterior of the shifting keys is adapted to engage the downwardly facing shoulder 264 in the bore of the locking sleeve 260 to lift the same when the guide string is lifted. The keys will lift the locking sleeve until the beveled shoulder 263 at the upper end thereof engages the downwardly facing shoulder 249 in the bore of the latching mandrel section 245. This assures that the retaining detent bosses 267 on the sleeve engage in the upper internal detent groove 271 in the bore of the latching mandrel section to retain the locking sleeve in such upper position, holding the locking bosses 252 on the collet members 250 in their expanded locking position, as shown in FIG. 14.

A further upward pull applied to the guide string GS will cause the shear pin 285, supporting the slidable sleeve 286 on which the shifting keys are mounted, to be sheared to permit the supporting sleeve to move downwardly on the mandrel in the bore of the upwardly facing receptacle or cup 287 threaded onto the lower end of the mandrel, in the same manner as in the patent. The downwardly and inwardly inclined surfaces 288 on the lower exterior ends of each of the keys engage the beveled shoulder 289 on the upper end of the bore of the cup or receptacle and positively wedge or cam the keys inwardly against the force of the spring 283, to hold the same retracted and permit the keys to pass the downwardly facing shoulder 264 in the bore of the locking sleeve 260, so that the guide string may be lifted out of the bore of the tubing string and the shifting tool and spear SP lifted upwardly therewith through the bore of the latching mechanism LM, and through the bore of the safety valve V and the replacement upper flow conductor section RT above the safety valve to the surface, as has been already described.

The spear SP may be any suitable commercial releasing type spear which will engage in the bore of the lower portions of the tubing strings T1 and T2 left in place in the well to support the same and provide a positive connection between the guide string GS and such tubing strings. The spears may be released in the usual manner to permit the upward movement therewith of the upshifting tools US, which lift the locking sleeves 260 upwardly to locking position. Thereafter, continued upward movement cams the shifting keys from shifting position to releasing position to permit complete withdrawal of the guide string GS and the upshifting tool and spear connected thereto from the well.

Figure 16A:
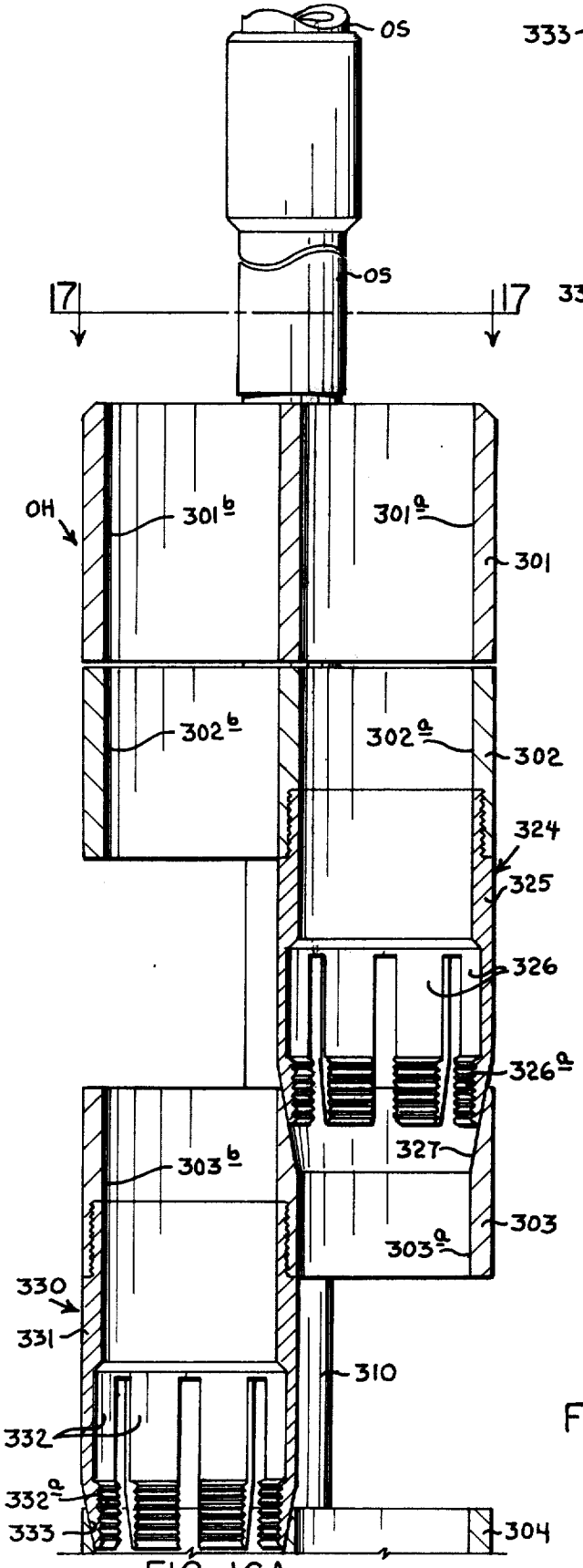
FIGS. 16A and 16B are longitudinal vertical views, partly in elevation and partly in section, showing the details of construction of the overshot hanger of FIGS. 4 through 11, inclusive.

One type of overshot hanger OH useful for supporting the upper ends of the tubing strings T1 and T2 left in place in the well, is illustrated in FIGS. 16A through 18C, inclusive. As shown in FIGS. 16A and 16B the overshot hanger comprises a plurality of body members 301, 302, 303, 304, 305, 306, and 307, all connected together in longitudinally spaced relationship by means of an elongate tubular conductor pipe or member 310 which is threaded into the underside of the upper body member 301 and extends downwardly through aligned bores 303d, 304d and 305d in the body members 303, 304 and 305, respectively, to the next lowest member 306, and is threaded into the upper end of an aligned threaded bore 306d therein. The lowermost body member 307 is connected to the next to lowest member by an elongate rod or shaft 311 having retaining nuts 312 threaded on its lower end, and which extends upwardly through aligned bores 307c, 306c, 305c, 304c and 303c in the body members, 307, 306, 305, 304 and 303, reaspectively, and has its upper end threaded into a threaded blind bore 302c in the lower end surface of the body member 302.

Figure 16B:
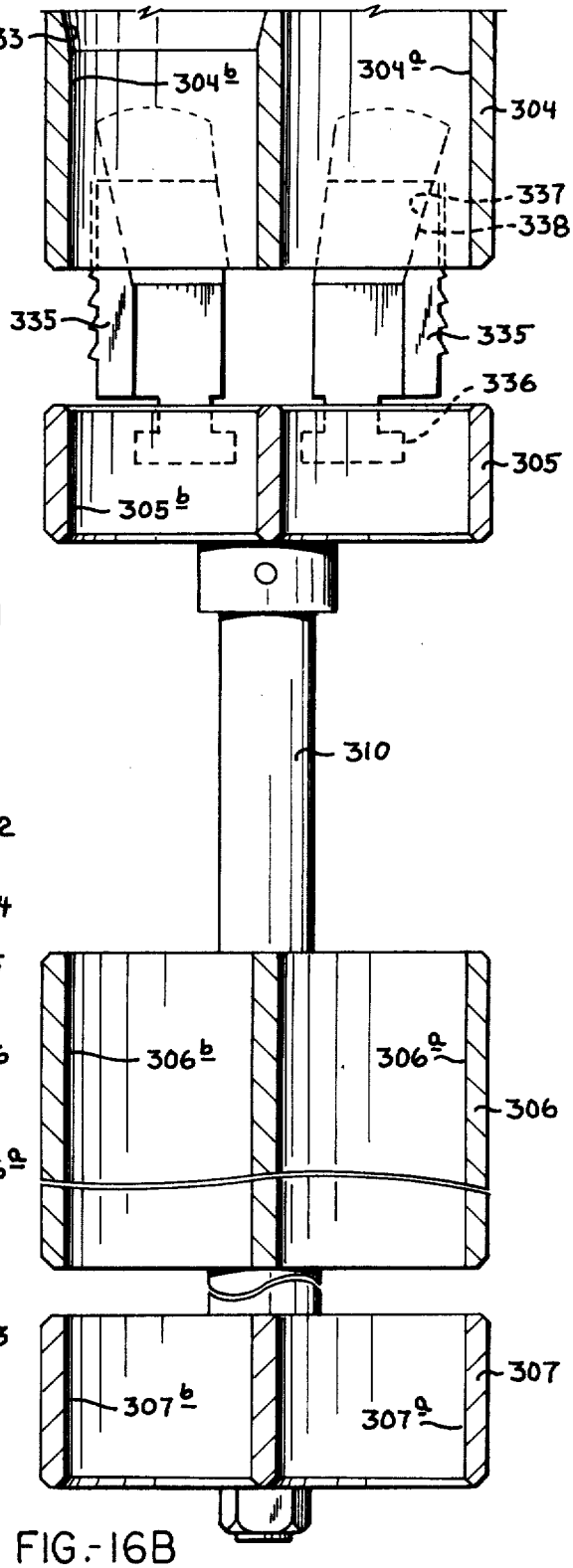

As will be seen in FIGS. 16A and 16B, each of the body members 301 through 307 is provided with a pair of laterally offset longitudinal bores through which the tubing strings T1 and T2 are insertable. The bores in each of the body members are identified by the corresponding numbers applied to the body members with suffixes a and b, so that the bore in each of the body members through which one of the tubing strings extends is defined as 301a through 307a, inclusive, while the bores in the body members through which the other tubing string extends are defined as 301b through 307b, inclusive.

As is shown in FIG. 18A, the upper end of the tubular connector member 310 is secured to the body member 302 by a shear pin 312 which prevents rotation of the upper section 301 with respect to the several body sections therebelow while the shear pin is integral and also prevents the other body members connected to the second body member 302 from sliding downwardly with respect to such upper body member until desired.

As is clearly shown in FIG. 18B, a connector rod 311 has a reduced lower rod 311a threaded into the lower end thereof below the body member 305, and the lower portion of the rod 311a has a piston 313 formed thereon which is disposed in a cylinder 314 formed in the body member 306 for a purpose which will be hereinafter more fully explained.

The lower body member 307 also has a piston 315 secured thereto and extending upwardly therefrom into a cylinder 316 formed in the body member 306, preferably in longitudinal alignment with the tubular connector member 310. Seal rings 315a are positioned in external annular recesses formed in the upper portion of the piston 315 for sealing between the piston and the wall of the cylinder 316. Similarly, seal rings 313a are positioned in external annular recesses formed in the piston 313 for sealing between that piston and the cylinder 314. The upper ends of the cylinders 314 and 316 are connected by a lateral conductor passage 318 whereby fluid may be conducted between the cylinders for a purpose which will be hereinafter explained.

Each of the body members 302, 303, and 304 is secured by shear pins 312, 319 and 320, respectively, to the tubular connector member 310. Similarly, the body member 305 is connected to said tubular connector member by one or more shear pins 320 extending into one or more suitable radial apertures or recesses formed in the exterior of the connector member and through a connector sleeve 321 threaded into the underside of the body member 305. These shear pins prevent disconnection of the body member 305 from the tubular connector member 310 until after the shear pins 312, 319 and 320 are sheared to permit movement of those body members in which they are disposed with respect to the connector member.

The body member 302 has a tubular collet type gripping slip member 324, secured to the lower side thereof in axial alignment with the aperture 302a, comprising a cylindrical body 325 having a plurality of depending integral spring fingers 326 with internally serrated gripping slip members 326a on their lower ends having downwardly and inwardly tapered outer surfaces 326b disposed to engage in a tapered wedge bowl 327 formed in the bore 303a of the next lower body member 303. The slip members are adapted to engage the tubing string extending through the bores 302a and 303a of the body members 302 and 303 when the slip members are moved downwardly with respect to the tapered bowl 327.

The body member 303 similarly has a gripping slip member 330 comprising a tubular body 331 threaded into the bore 303b and extending downwardly therefrom in axial alignment with said bore. A plurality of integral resilient spring fingers 332 are formed on the lower portion of the gripping member and inwardly facing serrated gripping slip members 332 are formed on the lower ends of the fingers and have downwardly and inwardly inclined wedge surfaces 332b on their outer sides which engage a correspondingly tapered locking bowl 333 in the bore 304b of the body member 304. This gripping member is adapted to grip the other of the tubing strings which is extending through the bores 303b and 304b of the body members 303 and 304 in the same manner as the gripping member 324 just described grips the tubing string extending therethrough.

The body member 305 has a plurality of conventional casing gripping slips 335 supported on the upper end surface thereof and retained thereon by T-shaped handles 336 engaging in corresponding T-shaped slots in the body member. The slips have external serrated gripping teeth 335a on their outer surfaces and downwardly and inwardly inclined wedge surfaces 337 on their inner surfaces disposed to engage similarly inclined complementary wedge surfaces 338 on the lower exterior of the body member 304, whereby the casing slips may be expanded outwardly into gripping engagement with the well casing in the well known conventional manner.

The lower end of the operating rod 311a below the piston 313 extends downwardly through the bore 340a of the locking sleeve 340 and through the opening 307a in the body member 307, and has retaining and locking nuts 312 screwed on the lower end thereof. The locking sleeve 340 has a plurality of locking wedge members 341 resiliently biased upwardly on an inwardly and upwardly tapered locking wedge surface 342 in the bore 340a of the sleeve by a helical coil spring 343 confined between the lower end of the locking wedge members 341 and a retaining ring 344 held in the bore of the locking sleeve by a snap ring 345. The exterior surface of the lower portion 311b of the connecting rod 311a is provided with a plurality of serrations or angular teeth for engagement by the serrated gripping teeth on the wedge members 341 to provide a more positive lock between the wedge members in the locking sleeve and the lower portion 311b of the connecting rod 311a for a purpose which will be hereinafter more fully explained. The rod 311a slides in the upper reduced bore 306c of the body member 306 and a plurality of seal rings 350 are disposed in internal annular recesses in such bore and seal between the body member 306 and the connecting rod 311a to confine fluid pressure in the cylinder bore 314 therebelow above the piston 313. Similarly, if desired, an internal annular seal ring 351 may be provided in the bore 306d for sealing between the tubular connector member 310 and the body member 306. Likewise, a seal ring 352 is provided in the bore 301d for sealing between the body member 301 and the upper end of the tubular connector member 310.

An operating string OS is connected to the body member 301 in axial alignment and flow communication with the bore 301d and a seal ring 353 is disposed in an internal annular groove in said bore for sealing between the body member and the operating string. The connection between the operating string and the body member 301 is preferably a coarse left hand thread to permit ready disconnection of the operating string from the body member when desired.

In operation, the overshot hanger is lowered into the well by means of the operating string OS telescoping over the upper ends of the tubing strings T1 and T2 in the manner already described. For sake of convenience, the bores 301a through 307a will be assumed to telescope over the tubing string T1 while the bores 301b through 307b will be assumed to telescope over the tubing string T2. The bores 301a through 307a and 301b through 307b are sufficiently large to slide over the integral joint members of the tubing strings T1 and T2, as has already been described. When the overshot hanger has been lowered to a desired point below the upper ends of the tubing strings T1 and T2, the hanger is locked in place in the casing for supporting the tubing strings, as will now be described.

With the overshot hanger at the desired point in the well bore, hydraulic fluid pressure is supplied through the operating string OS to the upper end of the tubular connector member 310, through which it flows downwardly into the cylinder 316 in the body member 306 to act on the piston 315 and through the passage 318 into the cylinder 314 to act on the piston 313. Such pressure acting on the pistons 315 and 313 moves the body member 307 downwardly and forces the connector rod 311a downwardly to move the externally serrated portion 311b of said rod downwardly through the locking wedge slips 341 in the locking sleeve 340. Such downward movement of the connector member 311a moves the connector member 311 to which it is connected downwardly to pull the body member 302 downwardly, shearing the pin 312 forcing the body member 302 downwardly on the tubular connector member 310. This action moves the upper tubing gripping slip member 326 downwardly in the slip bowl 327 of the body member 303 and wedges the gripping teeth 326a on the lower ends of the resilient fingers into gripping engagement with the tubing string T1 extending therethrough. Continued application of fluid pressure to the pistons 315 and 313 will cause the body member 306 to move upwardly relative to the body member 307 and so lift the body member 305 and the body member 304 upwardly relative to the body member 303, which is now held stationary by the engagement of the slip members 326a in the bowl 327 in the bore 303a thereof with the tubing string T1. Further application of fluid pressure to the hanger will shear the shear pin 314 connecting the body member 303 to the tubular connecting member 310, after which the body member 304 moves upwardly with respect to the body member 303 to engage the tapered bowl 333 with the gripping slip members 332a at the lower end of the resilient fingers 332 to force the same inwardly into gripping engagement with the tubing string T2 extending through the bore 303b of the body member 303 and the bore 304b of the body member 304. Further continued upward movement of the body member 306 lifts the tubular connector member 310 upwardly to shear the pin 320 in the body member 304 and move the casing gripping slips 335 carried by the body member 305 upwardly along the wedging surfaces 338 on the exterior of the body member 304 to expand the casing gripping slips into gripping engagement with the inner wall of the well casing and so lock the overshot hanger in gripping supporting engagement with the casing and with the two tubing strings extending therethrough.

When the hanger is so locked in place, the hydraulic fluid pressure applied through the operating string OS to the cylinders 314 and 316 is discontinued and the operating string may then be disconnected from the upper body member 301 by right hand rotation of the pipe to disengage the left hand threads at the lower end of the operating string from the threads 354 in the bore 301d of the body member 301 and leave the overshot hanger firmly anchored in place in the well casing. The wedge gripping members 341 engage the serrated surface 311b on the connecting rod 311a to positively hold the connecting rod in the lower position in which the members are telescoped together in gripping position.

Ordinarily, the overshot hanger is not removed until it is desired to rework the well, in which event the hanger may be removed in the usual manner by lifting the tubing string at the surface connected to the tubing string T1 or T2 to lift the hanger out of the casing and out of the well bore.

It is believed perfectly obvious that, if desired, a separate overshot hanger may be provided for each of the tubing strings T1 and T2, each hanger having two bores therethrough to receive the two tubing strings but only one of which has gripping members provided therein for engaging and supporting one of the tubing strings. Thus, one hanger for the tubing string T1 will have a bore sufficiently large to slide freely over the tubing string T2 and be provided with gripping members in the other bore to engage the tubing string T1 to support the same, while the other hanger will have its bore without slips telescoped over the tubing string T1 and the slips in its other bore in gripping engagement with the tubing string T2 for supporting the same, and the casing slips on each of the hangers engaged with the casing wall. In such an installation, the overshot hangers will be spaced vertically in the bore of the well sufficiently to permit their insertion and operation. The same hydraulic actuation of the gripping members may be employed, if desired.

Such a hanger may be also provided by merely omitting the gripping slip members 325 or 332, respectively, as the case may be, from the overshot hanger of FIGS. 16A through 18C so that the overshot hanger merely grips one of the strings of tubing extending therethrough.

Should it be desired to release the replacement upper tubing flow conductor portion and safety valve and latch mechanism from locking sealing engagement in the receptacle R, a suitable downshifting tool may be connected to the lower end of the guide string GS and inserted through the desired tubing string T1 or T2 into the latching mechanism for shifting the locking sleeve 260 therein downwardly to free the collet locking dogs 252 for inward and upward movement past the downwardly facing locking shoulder 230 in the bore of the receptacle. Such a downward shifting tool is illustrated in FIGS. 20A and 20B.

The downshifting tool DS is preferably connected to the lower end of a guide string GS and lowered through the replacement upper tubing portion until the downshifting tool engages the locking mechanism of the assembly as will be described. Obviously, the downshifting tool may be operated by through-the-flow-line pumpdown tools, if desired, by connecting a suitable locomotive member (not shown) to the upper end of the downshifting tool, or it may be operated by conventional wire line equipment, if desired. It is preferable that the guide strings be set in place and connected to the upper ends of the lower portion of the tubing string left in place in the well before the replacement upper flow conductor is removed from the well to facilitate the later reinstallation of the replacement upper flow conductor portion after the safety valve has been serviced, and this is accomplished by first removing the downshifting tool and then reinserting the guide string with an anchor and upshifting tool thereon prior to disconnecting the latching mechanism and removing the replacement upper flow conductor in the manner already described.

The downshifting tool DS comprises an elongate mandrel 401 which is connected at its upper end to the guide string GS, or to any other suitable operating mechanism by threads or the like. The mandrel has a shifting key sleeve 402 slidably mounted thereon and confined between a retaining sleeve 403 which is secured by a shear pin 404 to the mandrel against longitudinal movement thereon and is adapted to be engaged by the upper end of the shifting key sleeve to limit upward movement of the keys on the mandrel. Downward movement of the shifting key sleeve on the mandrel is limited by the upper end of an expander mandrel section 405 connected by screw threads to the lower end of the upper mandrel section 401. The expander member has an external annular enlargement having a downwardly and inwardly inclined wedge surface 406 thereon intermediate its ends for expanding a plurality of gripping slips 407 having tilted hardened disc inserts 408 brazed in suitable recesses in the exterior thereof providing downwardly facing gripping teeth for engaging the locking sleeve 260 to shift the same, as will be hereinafter more fully explained. The gripping slips are mounted on elongate spring arms 409 extending upwardly from a cylindrical body portion 410 which is threaded onto a supporting sleeve 411 slidable on the lower portion 412 of the mandrel expander section 405 which has its lower end reduced in diameter and provided with screw threads for receiving a retaining cup 413 in which a helical coiled spring 414 is confined between the lower end of the sleeve 411 and an upwardly facing shoulder 413a in the lower portion of the bore of the cup. The upper end of the cup telescopes over the lower portion of the sleeve 411 and confines the spring in the space therebetween. The spring acts to bias the gripping slips upwardly on the mandrel 405 along the inclined wedge surface 406 thereon for gripping the bore wall of the locking sleeve 260 in the latching mechanism for shifting the same downwardly from the upper position shown in FIG. 20A to the lower position shown in FIG. 13C.

For holding the gripping slips 407 in a position below the expander section 406 on the mandrel 405, a plurality of detent members or balls 415 are mounted in radial openings 416 in the mandrel above the lower end portion 412 thereof, and these balls are adapted to engage in an internal annular recess 417 formed between the cylindrical portion 410 of the slip assembly and the sleeve 411 connected to the lower end thereof. When the balls engage the upwardly facing beveled surface 417a on the upper end of the sleeve 411, the slips are held downwardly against movement upwardly relative to the expander wedge surface 406 of the mandrel. To hold the balls outwardly in the annular recess 415, an elongate control rod 420 is slidable in the bore 421 of the mandrel sections 401 and 405. The upper end of the control rod has an enlargement 422 thereon which is slidable in the bore of the upper section 401 of the mandrel and a shear pin 425 extends transversely through an aperture in the sleeve 403 and through a diametrical opening 427 in the enlarged head of the control rod. The shear pin slides in an elongate slot 430 formed in the wall of the mandrel section 401, until the mandrel section is moved downwardly a sufficient distance to cause the upper end of the slot to engage the shear pin and shear the same. The lower portion of the control rod 420 has an external annular locking flange 431 thereon which is disposed to engage between the detent balls 415 to hold the same outwardly in the annular locking recess 417 in the sleeve at the lower end of the gripping slips assembly. Thus, when the control rod is in the lower position with its lower end engaging the closure at the lower end of the bore 421 of the mandrel sections, the flange will engage the balls and hold the same outwardly in the groove 417 for engagement by the shoulders 417a, to hold the gripping slips in the lower position out of engagement with the expander wedge 406 on the expander section of the mandrel.

In operation, the tool is lowered into the well until the downwardly facing shoulders 435 of the shifting keys 436 engage in an internal annular stop groove 437 formed in the bore of the receptacle R below the upper end thereof, while the guide boss 438 at the lower end of the shifting keys engages in an internal annular recess 439 having inwardly divergent inclined shoulders at its upper and lower ends to permit the abrupt downwardly facing shoulders 435 on the keys to move outwardly in the recess 437 and engage the upwardly facing abrupt shoulder 440 in the recess to stop downward movement of the locator keys. When the locator keys are engaged in the annular grooves 437 and 439 in the manner just described, downward movement of the keys and the sleeve which supports them is arrested. Similarly, the engagement of the retainer sleeve 403 with the upper end of the locator key sleeve 402 prevents downward movement of the retainer sleeve, until further downward movement of the mandrel section 401 shears the pin 404 to permit the mandrel section to move further downwardly. Such downward movement of the mandrel section is permitted by movement of the pin 425 in the slot 430, and the lower portion of the expander section 405 of the mandrel is moved downwardly to move the balls 415 downwardly with respect to the external flange 431 on the control member 420 until the balls move below the lower end of the external flange and may move readily inwardly in the apertures 416 out of the internal annular groove 417 in the slip carrier sleeve to free the slip carrier sleeve and the actuating sleeve 411 to be moved upwardly by the spring 414 to force the slip gripping members 407 upwardly on the inclined wedge surface 406 to expand the gripping members into gripping engagement with the bore wall of the locking sleeve 260, as shown in FIG. 20A.

When the slips are engaged with the bore of the locking sleeve 260, further downward force applied to the upper mandrel section 401 will move the same downwardly to shear the pin 425 and permit the mandrel section to move downwardly with respect to the locator keys to shift the locking sleeve 260 to the lower position shown in FIG. 13C, where the outer locking surface on the section 261 thereof is out of engagement with the collet members 250, to permit the external bosses 252 on the mid-portions of said collet members to be moved inwardly by engagement of the upper beveled locking shoulders 253 thereon with the downwardly facing locking shoulders 230 in the bore of the receptacle, so that the replacement upper flow conductor portion, the safety valve, and the latching mechanism may all be removed from connection and sealing flow communication with the receptacle R.

Obviously, this procedure may be performed on any one of the latching mechanisms in place in the well.

After the locking sleeve 260 has been moved to its lower position, the guide string and down shifting tool DS are lifted out of the well through the replacement upper flow conductor portion above the receptacle and a guide string having the releasing spear SP and upshifting tool US thereon is lowered into the well through the replacement flow conductor portion and anchored in engagement with that portion of the tubing string T1 or T2 left in place in the well below the receptacle, whereupon the replacement flow conductor portion may be stripped off over the guide string and out of the well, carrying the safety valve and latching mechanism with it for repair, replacement, or the like.

When the downshifting tool is lifted out of the well after the locking sleeve 260 has been moved to the lower position, engagement of the detent bosses 267 in the lower detent recess or groove 270 prevents upward movement of the locking sleeve 260 thereby as the downshifting tool is withdrawn.

It is also believed to be obvious that, if desired, the bore of the locking sleeve 260 may be enlarged in its upper portion, as shown in dotted lines in FIGS. 14 and 15, to provide a recess 260a and an upwardly facing shifting shoulder 264a which may be engaged by an upshifting tool US connected to the guide string GS in an inverted position so that the abrupt shoulder 284 on the upshifting tool faces downwardly to engage the upwardly facing shoulder 264a in the locking sleeve. This would permit ready shifting of the locking sleeve by the upshifting tool and guide string in wells in which there is no need for use of other types of shiftable equipment in the well, and would eliminate use of the downshifting tools of FIGS. 20A and 20B.

In FIGS. 21 through 29, inclusive, is illustrated the method of the invention carried out in a well in which tubing strings T4 and T5 are suspended in the well in the same manner as the tubing strings T1 and T2 of the method first described, but in which the tubing strings are the conventional type having couplings or collars 501 connecting adjacent sections 502 of the tubing strings, rather than the integral joint type tubing strings such as the Hydril Integral Joint Tubing String of the installation shown in FIGS. 1 through 11. In carrying out the method in this modification, it is usually necessary to part or cut the tubing string between adjacent couplings to permit installation of a pack-off overshot connection between the portion of the flow conductor left in place in the well and the replacement upper portion of the flow conductor inserted in the well having the safety valve connected therein.

In this form of the method, a well installation such as is shown in FIG. 21, which is identical to that of FIG. 1 other than that each tubing string is composed of the usual separate joints connected by couplings or collars, the tubing strings may be parted between adjacent couplings at a desired elevation in the well by mechanical cutters MC4 and MC5, such as are illustrated schematically in FIG. 22. The mechanical cutters are lowered on the guide strings GS4 and GS5 having spears SP4 and SP5 at their lower ends and having the cutters MC4 and MC5 connected therein at the desired location above the spears. The cutters are operated in the usual manner to part the tubing strings at the elevation U4 and U5 to separate the upper portions from the portions to be left in place in the well in the same manner as in the method set forth in FIGS. 1 through 11.

As shown in FIG. 23, the tubing strings have been parted and the upper portions are being stripped off over the guide strings GS4 and GS5 for removing the same from the well. After the upper portions have been so removed, a suitable mill M, which may be an overshot mill, or other suitable milling tool, is lowered over the guide string to cut off or smooth the rough upper ends of the tubing strings T4 and T5 left in place in the well, as shown in FIG. 25.

After the upper ends of the tubing strings left in place in the well have been milled in the usual manner to smooth the same, the overshot hanger OH4 is lowered along the guide strings GS4 and GS5, to telescope over the upper ends of the tubing strings T4 and T5 in the same manner as in the method of FIGS. 1 through 11, and anchored in place in the well casing C in gripping engagement with said casing and with the tubing strings T4 and T5, as shown in FIG. 27. The operating string OS4 is then disconnected from the overshot hanger OH4 and removed from the well, leaving the upper ends of the tubing strings T4 and T5 supported by the overshot hanger.

Now, as shown in FIGS. 28 and 29, the replacement upper flow conductor portions RT4 and RT5 are lowered into the well casing in the same manner as in the method first described. However, the lower ends of the replacement flow conductor portions have pack-off overshots POO4 and POO5 on the lower ends thereof, which may be any desired commercial form of pack-off overshots which will engage over the free upper ends of the tubing strings T4 and T5, respectively, in place in the well to grip and seal therewith and provide a path of flow communication from the tubing strings through the replacement upper flow conductor sections or portions RT4 and RT5 to the surface.

Safety valves V4 and V5 are connected in the replacement upper flow conductor portions RT4 and RT5, respectively, in the same manner as in the method first described, and the upper ends of the replacement flow conductor portions are connected to the tubing hanger and well head and anchored in place therein in the manner already described.

The flow control lines CF4 and CF5 for controlling actuation of the safety valves V4 and V5, respectively, are also connected in the same manner as has already been described, and the well is then in condition for operation as shown in FIG. 29.

From the foregoing, it will be seen that this method is carried out in substantially identical manner to the method first described, but that rather than utilizing the receptacle R, we have utilized the pack-off overshots POO4 and POO5 for connecting the replacement upper flow conductor portions to the upper ends of the tubing strings T4 and T5 in flow conducting array.

FIGS. 30 through 33 illustrate still another method of parting the tubing, wherein the parting is effected by means of chemical cutters CC6 and CC7 lowered into the tubing strings T6 and T7, respectively, from the surface by wire line or other operating means in the usual manner for chemically cutting the tubing strings T6 and T7 in the conventional manner by chemical process to part the upper portion of the tubing strings T6 and T7 from the lower portions thereof which are to be left in place in the well. In this method, the lower portions of the tubing strings are not provided with an overshot hanger for supporting the same, but are left in the well supported by the packer P2 therebelow. It is usual, following use of chemical cutters CC6 and CC7, that the upper ends of the pipe are left relatively smooth and milling may not be required. It is further to be recognized that the chemical cutters CC6 and CC7 may preferably not completely part the tubing strings, but will cut an internal annular groove therein or in a plurality of recesses in the bore wall of the tubing closely adjacent each other in sufficient number to permit the upper end of the tubing to be parted by an upward pull thereon. This is a customary operation and is a well known method of parting tubing strings in wells. If the cutter does not cut a smooth surface, obviously the milling tool M may be lowered to dress or smooth the upper end of the tubing strings T6 and T7 left in place in the well, and the pack-off overshots installed over such upper ends in the manner already described in connection with FIGS. 21 through 29, inclusive.

Guide strings GS6 and GS7 having spears on the lower ends thereof are run or lowered through the tubing strings into the portions to be left in place in the well until the spears are located below the point at which the chemical cutter has been actuated, to support the upper ends of the tubing strings while the strings are being parted by an upward pull applied thereto at the surface. The overshot mill M may then be lowered over the guide strings to smooth the upper end of the tubing strings left in place in the well. The replacement upper flow conductor portions RT6 and RT7 are then inserted over the guide strings until the pack-off overshots POO6 and POO7, respectively, are engaged over the upper ends of the tubing strings T6 and T7 left in place in the well to establish a path of flow communication through said tubing strings and the respective replacement upper flow conductor portions RT6 and RT7 connected thereto by the pack-off overshots POO6 and P007, respectively. Other parts of the installation are identical to those of FIGS. 21 through 29 and the well is operated in the same manner after it has been placed in condition for operation as shown in FIG. 33.

As is customary in the oil fields, the installation shown in FIGS. 32 and 33 may be accomplished by "spacing out" the replacement upper flow conductor portions above the pack-off overshots POO6 and POO7 to assure the proper length of pipe between the pack-off overshots and the well head, the proper tension on the tubing strings and the proper weight on the packers therebelow, as is well known.

This is easily accomplished in this method because the portion of the flow conductors T6 and T7 removed from the well after being cut off from the portions left in place therein may be utilized to provide measurements assuring the proper spacing of the elements of the flow conductors reinstalled in the well when the same is completed for production.

If desired, it is also believed readily apparent that a receptacle R6 and R7 may be connected in the replacement upper flow conductor portions RT6 and RT7 above the packoff overshots POO4 and POO5, as illustrated at R4 and R5 in FIG. 29. Further, such receptacles R6 and R7 may be connected in the replacement upper flow conductor portions RT6 and RT7 above the pack-off overshots POO6 and POO7 as shown in FIGS. 32 and 33. This structure would permit the use of the latch mechanisms in the receptacles and removal of the safety valves V4, V5, V6, and V7 from the wells, when desired, in the same manner as in the method of FIGS. 1 through 11, to permit servicing, repair or replacement of the valves, or any of the other equipment in the replacement upper flow conductor portions.

It is believed apparent that in well having tubing strings with the usual couplings therein as illustrated in FIGS. 21 through 29, inclusive, in some instances in some wells the tubing may be parted at one of the couplings in the same manner as the tubing strings T1 and T2 of the integral joint tubing were parted in the method illustrated and described in connection with FIGS. 1 through 11. In such event, as shown in FIG. 34 an explosive charge PC is lowered in the tubing to a position adjacent a selected one of the couplings CP, by means of a guide string GS lowered into the tubing string with a spear SP connected to the lower end thereof and an upshifting tool US thereabove. A conventional collar finder KF, such as that illustrated and described in the U.S. Pat. to Otis et al., No. 2,571,934, is also connected in the guide string at a point sufficiently above the spear and upshifting tool to engage in a coupling recess above the coupling CP and permit the spear and upshifting tool to be positioned a suitable distance below said coupling. The explosive charge, such as a short length of Primacord, is fixed to the guide string GS between the collar finder and the upshifting at a point below the collar finder at which the charge is adjacent or within the coupling CP when the collar finder is engaged in the couplings recess at the upper end of the pipe joint PJ connected to the upper end of the coupling CP. The spear SP is then engaged with the tubing string below the coupling CP. A right hand torque is applied to the guide string and tubing below the coupling CP, while a left hand torque is applied to the tubing string above the coupling CP, and the explosive charge PC is then detonated to loosen the coupling CP. The tubing string above the coupling is then rotated in a left hand direction about its longitudinal axis to disconnect the tubing section or joint PJ and the joints thereabove from the tubing below the loosened coupling. If the coupling unscrewed at its lower thread end and came out of the well with the joint PJ and the upper portion of the tubing string removed, it is obvious that a coupling may be connected to the lower end of a receptacle R and threaded onto the pin end of the tubing string T11 left in place in the well in the manner set forth in connection with the method of FIGS. 1 through 11. If on the other hand, the coupling unscrews at its upper thread end and was left in place in the well, only the pin end of the receptacle R needs to be inserted and connected into the coupling or collar CP at the upper end of the tubing string T11 in the same manner as the method of FIGS. 1 through 11. Obviously, therefore, where no overshot hanger is to be used, the same method as is practiced in the description of the method set forth in FIGS. 1 through 11 may be carried out in a well having the customary usual joints of pipe and couplings or collars connecting the same. In this case, the weight of the tubing string below the receptacle would be supported on a packer P2 therebelow.

Obviously, the collar finder may be used to locate the coupling recess above pipe joint PJ, the guide string marked at the surface, the collar finder released, and the guide string then manipulated to position the spear SP and upshifting tool US below the coupling CP and the explosive charge PC within or immediately adjacent said coupling before applying the opposing torques and detonating the explosive charge in the manner already explained. The remaining steps of the method may then be performed.

Utilizing these methods of parting the pipe and installation of the replacement upper flow conductor portions in the well eliminates the necessity for the overshot hanger.

It is believed obvious that, if desired, the safety valve V installed in the replacement upper flow conductor portion RT in any of the methods heretofore described may be a valve of the construction illustrated in the application of Donald F. Taylor, Ser. No. 99,534, filed Dec. 18, 1970, now U.S. Pat. No. 3,696,868, which is designed to accommodate a replacement safety valve V9 installed in the valve V8 anchored in place therein in sealing engagement with the housing of the valve V8 for controlling flow through the housing of the valve V8.

The valve structure illustrated in FIGS. 13A and 13B includes a retainer mechanism 190 operable for holding the valve closure member in the open position. As is shown, the retainer mechanism is contained within the latch housing 183 below the lower end of the landing nipple N and above the upper end of the actuating sleeve 125.

The retainer mechanism includes an elongate sleeve 191 which fits slidably within the bore 182 of the latch housing 183 immediately below the lower end of the landing nipple N connected thereto, and is retained in such position by a shear pin 192 disposed in a lateral opening 193 in the latch housing and confined therein by a retaining set screw 194 which may be secured in place by means of a suitable compound preventing leakage past the threads and disengagement of the plug from the bore of the opening. The inner end of the pin 192 engages in a recess 195 formed in the exterior wall of the sleeve 191 and so positively holds the sleeve in the upper position until the pin is sheared. Any desired number of such pins may be provided to obtain a required desired force to be applied to the sleeve to move it downwardly from such position.

The bore of the latching or retainer sleeve 191 is formed with a plurality of internal recesses or grooves 196 having a total configuration which does not conform to any other series of grooves in the bore of the flow conductor, packer or landing nipples thereabove or therebelow. The recesses or grooves 196 are adapted to be engaged by a suitable shifting tool as is explained in the aforementioned U.S. Pat. No. 3,696,868, to Donald F. Taylor for moving the retainer sleeve downwardly to lock the actuator sleeve in its lower position and hold the valve open.

A detent or retainer member 210 formed by a split ring 215 engaged in an annular groove or recess 220 is disposed to engage an upwardly facing external annular shoulder 218 on the retainer sleeve 191 to hold the same in its lower position.

FIG. 35 shows schematically a valve V8 of the type heretofore described installed in a replacement upper flow conductor RT, as has been suggested hereinabove, with a replacement safety valve V9 anchored in place therein after the valve closure of the valve V8 has been locked in the open position.

The valve housing 610 has the usual control fluid line CF8 connected thereto for controlling actuation of the valve. The ball closure member 620 is operated in the same manner as the ball B of the Taylor application, by means of a slidable actuating sleeve 625 and the spring 679.

Should the valve V8 fail or become unsatisfactory for any reason, the same may be locked in the lower open position by the shiftable locking sleeve 690, as shown in FIG. 35, and the replacement valve V9 be lowered through the replacement upper flow conductor portion RT, through the bore of the actuating sleeve 625, and the open ball closure member 620, until the seal member 650 on the lower end of the valve V9 engages and seals against the bore wall of the housing 610 below the valve closure 620. An upper seal 651 carried by the valve V9 seals in the bore of the landing nipple 611 at the upper end of the valve housing 610, and anchoring dogs 670 engage in the stop and locking recesses 612 in the bore of the landing nipple to position said upper seal in sealing engagement with the sealing surface 613 in said landing nipple.

With the valve anchored in the position shown in FIG. 35, the control fluid pressure from the control fluid line CF8 will pass upwardly exteriorly of the locking sleeve 690 through an L-shaped flow passage 691 into the bore of the housing above the locking sleeve where it will be confined in the housing 610 between the seal members 650 and 651 on the replacement valve V9. The control fluid from the control fluid line CF8 may therefore be used to control the operation of the valve V9.

If desired, and if the L-shaped flow passage 691 is not provided, as is the case in the valve V of FIGS. 13A through 13E, the actuating sleeve 625 may be perforated by a cutter or punch of the usual well-known type to provide an aperture 625a (shown in dotted lines in FIG. 35) in the wall thereof above the piston 676 to permit the control fluid pressure to pass from the control fluid line CF8 to the bore of the actuating sleeve 625 between the packing or seal members 650 and 651 for actuation of the valve V9.

This structure permits insertion of a supplemental surface controlled subsurface safety valve in the well without the necessity of removing the replacement upper flow conductor portion RT until such is absolutely necessary.

It is readily apparent that the valve V9 may be inserted into the position shown in FIG. 35 by means of the usual flexible line operating mechanism, through-the-flow-line pump-down tools, or any other suitable means.

FIG. 36 shows a further modification of the valve used in the system and in practicing the method, wherein a valve V10 is installed in a landing nipple LN10 forming a part of the replacement upper flow conductor portion RT10 having the pack-off overshot POO10 connected to the lower end thereof and engaged over the upper end of the flow conductor or tubing string T10 left in place in the well, as has been described in connection with FIGS. 21 through 29, and 30 through 33.

The landing nipple LN10 is the usual type having the control fluid line CF10 connected to a lateral inlet 788 communicating with the bore of the landing nipple, and the valve V10 may be identical to the valve V9 shown in FIG. 35. The landing nipple LN10 has internal annular locking recesses or grooves 712 therein for receiving the locking dogs 770 of the locking mechanism of the safety valve V10, and the seal members 750 and 751 on the exterior of the valve assembly seal against the internal bore wall 713 of the landing nipple LN10 above and below the lateral inlet port 789 in the inlet fitting 788 to which the control fluid line CF10 is connected. Control fluid introduced into the bore of the landing nipple will pass through the port 715 of the valve V10 to control actuation of the closure member therein in the same manner as in the form of FIGS. 13A through 13E.

It is believed manifest that the safety valve V10 is readily insertable into and removable from the landing nipple LN10 by flexible line operating mechanism, through-the-flow-line pump-down equipment, or any other suitable equipment for lowering the valve into place in the landing nipple and locking it in position therein.

It is believed readily apparent that all the objects of the invention have been readily accomplished, and that a new and improved method of servicing a well having a flow conductor already in place therein to provide surface controlled subsurface safety valve in the well without removing the entire well flow conductor and equipment and completely reworking the well. Also, these methods permit the installation of a safety valve below the surface for controlling flow from offshore wells or other wells which would be subject to damage of the surface connections, and the like, to prevent undesired flow from the wells upon the occurrence of any such undesired conditions.

It is also believed readily apparent that, if desired, any well-known commercial type safety joint may be provided in the replacement upper flow conductor portion above the safety valve and below the well head to facilitate reworking the well in the event of a disaster which destroyed or damaged the surface connection and the upper ends of the tubing strings above the safety valve. Such a safety joint would permit ready parting of the tubing strings at such safety joint for replacement of the upper portion thereabove and recompletion of the well in the usual manner, to quickly and economically place the well back in operation and production.

This form of the valve facilitates servicing the valve and the flow controlling parts thereof, and eliminates the necessity for movement of the replacement upper flow conductor portion RT10 thereabove to do so.

If desired, the valve and landing nipple of FIG. 36 may be connected in any one of the replacement upper flow conductor portions hereinbefore illustrated and described, or the valve and landing nipple may be connected in tandem with any of the valves previously described.

In such latter tandem type installations, a tubular sleeve having an anchoring mechanism and upper and lower seals similar or identical to those of the valve V10, but provided with an uninterrupted open flow path therethrough may be lowered into and locked in place in the landing nipple LN10 until it is desired to install the safety valve V10 in place therein. In this case, the tubular sleeve would be removed in the usual manner and the valve inserted in its place for control of flow by actuation of the valve in the manner already described.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. Apparatus for treating a well having one or more flow conductors therein to install a surface controlled subsurface safety valve in each such flow conductor of the well for controlling flow from the well therethrough which includes: guide and support means insertable through each well flow conductor to engage the flow conductor at a point below which it is desired to part said conductor for removal of the upper portion of said conductor thereabove leaving the lower portion of the conductor in place in the well; means for parting the upper portion of each original flow conductor from the remainder thereof left in place in the well at the selected point in the flow conductor for removal of the upper portion of the flow conductor from the well while leaving the lower portion engaged with and supported by the guide support means; means including replacement flow conductor means for each separate flow conductor of the well having surface controlled safety valve means therein insertable into the well telescoped over the guide and support means into engagement with the upper end of the lower portion of the flow conductor left in place in the well and having connecting means for connecting said replacement flow conductor means with the upper end of the original flow conductor left in the well engaged with and supported by the guide and support means over which said replacement flow conductor means is telescoped, said guide and support means being removable from within the replacement flow conductor means after said replacement flow conductor means has been connected to the upper end of said original low conductor left in place in the well for removal of said guide and support means from the well; and control means at the surface connected to each of the subsurface safety valve means and operative in response to predetermined conditions sensed in the well or at the surface for actuating each of said safety valve means to cause the same to move to closed position upon the occurrence of such predetermined sensed conditions, whereby wells may be provided with surface controlled subsurface safety valve apparatus without disturbing the flow conductors below the point of parting and removing the upper portion thereof and without disturbing the remainder of the flow conductor and well apparatus left in place in the well therebelow.

2. Apparatus of the character set forth in claim 1 wherein the control means at the surface comprises separate control means for controlling each of the subsurface safety valve means independently.

3. Apparatus of the character set forth in claim 1 wherein the connecting means connecting each said replacement flow conductor means with the upper end of the each original flow conductor left in place in the well comprises: first connector means on one and second connector means on the other of said replacement flow conductor means and said original flow conductor left in place in the well releasably engageable to connect said replacement flow conductor means in sealed flow communication with the upper end of said original flow conductor left in place in the well whereby well fluids flowing upwardly through said original flow conductor left in place in the well will be directed through said replacement flow conductor means and the subsurface safety valve means therein to control the flow of such well fluids from the well.

4. Apparatus of the character set forth in claim 3 wherein said first connector means comprises a receptacle and said second connector means comprises a latching mechanism means insertable in and removable from said receptacle in locked sealing position therein to permit insertion and removal of said replacement flow conductor means and the safety valve means in said well without disturbing said original flow conductor with which said replacement flow conductor means is connectable.

5. Apparatus of the character set forth in claim 1 wherein the means for parting each of said original flow conductors comprises: mechanical cutter means having knives engageable with each said original flow conductor for severing the original flow conductor at said selected point below the surface of the earth while said guide and support means remains in place connected with the upper end of said lower portion of the original tubing left in place in the well to permit the severed upper portion to be removed from the well over the guide means.

6. Apparatus of the character set forth in claim 1 wherein the means for parting each of said original flow conductors comprises: chemical cutter means for directing a chemical to a selected area of the wall of said original flow conductor to produce controlled localized cutting of said flow conductor at said selected point below the surface before said guide and support means is lowered into and connected with the upper end of said lower portion of the original tubing left in place in the well to permit the severed upper portion to be removed from the well over the guide means.

7. Apparatus of the character set forth in claim 1 wherein said guide and support means includes: gripping means at the lower end of guide and support means releasably engageable with each original flow conductor at a desired subsurface level in the well below that at which the flow conductor is to be parted before, during, and after said original flow conductor is parted at said selected level therein.

8. Apparatus for treating a well having a flow conductor in place therein which includes: guide and support means insertable through each well flow conductor and having gripping means thereon to releasably engage the flow conductor at a point below which it is desired to part said conductor for removal of the upper portion of said conductor from the well leaving the lower portion of the conductor in place in the well; means for parting the flow conductor in the well at said point below the surface; means for removing the upper portion of the flow conductor parted from the remainder thereof; a replacement upper flow conductor insertable into the well telescoped over said guide and support means after the upper parted portion of the original conductor has been removed; means for connecting said replacement upper flow conductor at its lower end with the upper end of said lower portion of the original flow conductor left in place in the well; and flow controlling means in said replacement upper flow conductor for controlling flow from the well through the original flow conductor left in place in the well and the replacement upper flow conductor connected thereto in response to sensed predetermined conditions.

9. The apparatus of claim 8 wherein the flow controlling means includes: surface controlled subsurface safety valve means connected in said replacement upper flow conductor; and control means at the surface and connected to the subsurface safety valve means and operative in response to predetermined conditions sensed in the well or at the surface to actuate said safety valve means to move to closed position upon the occurrence of such predetermined sensed conditions.

10. The apparatus of claim 9 wherein said subsurface safety valve means includes: a landing receptacle forming a part of said replacement upper flow conductor and having a lock recess therein; and said safety valve has locking members thereon engageable with the lock recess in said landing receptacle when said safety valve is disposed therein said safety valve being insertable in and removable from said landing receptacle through said replacement upper flow conductor.

11. Apparatus for installing a flow controlling safety system in a well having a flow conductor in place therein extending from a producing earth formation to the surface, including: means for parting said flow conductor at a desired point in the well and removing the upper portion of the flow conductor above the point of parting from the well and leaving the portion of the flow conductor below the point of parting in place in the well to form a lower flow conductor means disposed in said well with its lower end in flow communication with the producing earth formation; replacement upper flow conductor means disposable in said well and having surface controlled subsurface safety valve means therein; first connecting means on the lower end of said replacement upper flow conductor means; second connecting means on the upper end of said lower flow conductor means coengageable with said first connector means for releasably connecting the lower end of said upper flow conductor means in flow communication with the upper end of said lower flow conductor means; control means at the surface connected to said subsurface safety valve means and operative in response to predetermined conditions sensed in the well or at the surface for actuating said subsurface safety valve means to cause the same to move to closed position upon the occurrence of such predetermined sensed conditions; and means for releasing said first connecting means at the lower end of the upper flow conductor means from the second connecting means on the upper end of the lower flow conductor means whereby said upper flow conductor means and the subsurface safety valve means therein are removable from the well without disturbing said lower flow conductor means.

12. A system for treating a well having one or more flow conductors therein to install a surface controlled subsurface safety valve in each such flow conductor of the well for controlling flow from the well therethrough which includes: support and guide means insertable in and removable from each of such flow conductors extending from the surface to a desired subsurface level to engage and support each of such flow conductors thereat while the upper portion of such conductors above such level is parted therefrom and removed from the well and to guide a replacement flow conductor means into flow communicating engagement with a selected original flow conductor; means for parting the upper portion of each of the original flow conductors above such desired subsurface level from the remainder thereof left in place in the well for removal from the well while said support and guide means is in place engaged with the upper end of said lower portion of said well flow conductor; means including a replacement flow conductor means for each separate flow conductor of the well having surface controlled subsurface safety valve means therein insertable over said support and guide means into the well into engagement with the upper end of the lower portion of said flow conductor left in place in the well and having connecting means for connecting said replacement flow conductor means with the upper end of the original flow conductor left in place in the well while said original flow conductor is engaged by said support and guide means; and separate control means at the surface connected to each of the subsurface safety valve means and operative in response to predetermined conditions sensed in the well or at the surface for actuating each of said safety valve means to move to closed position upon the occurrence of such predetermined sensed conditions, whereby said well may be provided with surface controlled subsurface safety valve apparatus without disturbing the flow conductors below the point of parting and removing the upper portion thereof and without disturbing the remainder of such flow conductors and well apparatus left in place in the well therebelow.

13. A system for treating a well having one or more flow conductors therein to install a surface controlled subsurface safety valve in at least one such flow conductor of the well for controlling flow from the well therethrough which includes: means for removing an upper portion of at least one of the original flow conductors including guide and support means insertable through the upper portion of said one or more of said original flow conductors to engage said original flow conductor at a point below that at which the conductor is to be separated to permit removal of the upper portion leaving the lower portion in place in the well, and means for parting said original flow conductor at said selected point to permit removal of the upper portion thereof from the well over the support and guide means engaged with the lower portion left in place in the well; means including replacement flow conductor means for said at least one flow conductor having surface controlled subsurface safety valve means therein insertable over said support and guide means into the well into engagement with the upper end of the lower portion of said flow conductor left in place in the well and having releasable connecting means for connecting said replacement flow conductor means with the upper end of the remainder of said at least one of the original flow conductors left in place in the well while said support and guide means is engaged with said remainder of said original flow conductor; and control means at the surface connected to each of the subsurface safety valve means and operative in response to predetermined conditions sensed in the well or at the surface for actuating each of said safety valve means to move to closed position upon the occurrence of said predetermined sensed conditions, whereby said well may be provided with surface controlled subsurface safety valve apparatus in at least one of said original flow conductors without disturbing said flow conductor below the point of parting and removing the upper portion thereof and without disturbing the remainder of the flow conductors and well apparatus left in place in the well.

14. The system of claim 13 wherein the connecting means for connecting the replacement flow conductor to the upper end of the remainder of the original flow conductor left in place in the well includes: first locking and sealing means on one end and second locking and sealing means on the other of said replacement flow conductor means and the upper portion of said remainder of the original flow conductor left in place in the well coengageable to connect said replacement flow conductor means in sealed flow communication with said upper portion of said remainder of the original flow conductor whereby well fluids flowing upwardly through said remainder of said original flow conductor will be directed through said replacement flow conductor means and through the safety valve means connected therein to control the flow of such well fluids from the well.

15. The system of claim 14 wherein said first locking and sealing means comprises receptacle means having a lock shoulder and a sealing surface therein; and said second locking and sealing means comprises: expansible and retractable lock members and seal means insertable in said receptacle means and engageable with said lock shoulder and seal surface; and means for disconnecting said lock members from said shoulder for separation of said first and second lock means from each other to permit removal of the replacement upper flow conductor from the well.

16. Apparatus for treating a well having one or more flow conductors therein to install a surface controlled subsurface safety valve in each such flow conductor of the well for controlling flow from the well therethrough which includes: means for parting and removing the upper portion of each original flow conductor from the remainder thereof left in place in the well comprising guide and support means insertable through the flow conductor into place in the flow conductor and connected at its lower end to said flow conductor at a point below that at which the flow conductor is to be parted, and means for parting said flow conductor above such connection after said guide and support means has been positioned in said flow conductor, to separate the upper portion of the flow conductor from the lower portion of the original flow conductor to be left in place in the well, whereby the upper separated portion of the flow conductor may be removed from the well bore while the guide means is left in place in and supporting the upper end of the lower portion of the original flow conductor left in place in the well; means including replacement flow conductor means for each separate flow conductor of the well having surface controlled subsurface safety valve means therein insertable into the well telescoped over the guide and support means into engagement with the upper end of the lower portion of said flow conductor left in place in the well and having connecting means for connecting said replacement flow conductor means with the upper end of said original flow conductor left in place in the well connected with and supported by said guide and support means; said guide and support means being disconnectable from said lower portion of said original flow conductor and removable from the well after said replacement flow conductor means has been connected with the upper end of said lower portion of said original flow conductor; and control means at the surface connected to each of the subsurface safety valve means and operative in response to predetermined conditions sensed in the well or at the surface for actuating each of said safety valve means to cause the same to move to closed position upon the occurrence of such predetermined sensed conditions, whereby wells may be provided with surface controlled subsurface safety valve apparatus without disturbing the flow conductors below the point of parting and removing the upper portion thereof and without disturbing the remainder of the flow conductor and well apparatus left in place in the well therebelow.

*17. A shifting tool for well equipment comprising, a mandrel,*

*locator key means carried by the mandrel for engagement with a shoulder within the bore of a well tool to land the shifting tool,*

*relatively movable slip means and slip expander means carried by the mandrel,*

*means responsive to movement of the mandrel relative to the locator means for moving at least one of the slip means and slip expander means toward the other to expand and set the slips,*

*said slips while expanded into engagement with a well tool movable relative to said locator key means to shift the portion of said well tool engaged by the slips.*

*18. A shifting tool for well equipment comprising,*

*a mandrel,*

*locator key means slidably carried by the mandrel for engagement with a shoulder within the bore of a well tool to land the shifting tool,*

*relatively movable slip means and slip expander carried by the mandrel,*

*means resiliently urging at least one of the slip means and slip expander toward the other to expand the slips into engagement with the well tool,*

*releasable latch means releasably latching the slip means and slip expander in unexpanded relationship,*

*and means for releasing said latch means in response to movement of said mandrel relatively to said locator key means,*

*said slips movable relative to said locator key means after said latch means is released and the slips are expanded by said resilient means to shift said slip means relative to said locator key means and shift the portion of the well tool engaged by said slip means.*

*19. A shifting tool for well equipment comprising,*

*a mandrel,*

*locator key means slidably carried by the mandrel for engagement with a shoulder within the bore of a well tool to land the shifting tool,*

*shear pin means pinning the locator key means to the mandrel and shearing upon continued movement of the mandrel after the locator key means has engaged a shoulder within the bore of a well tool,*

*relatively movable slip means and slip expander carried by the mandrel,*

*means resiliently urging at least one of the slip means and slip expander toward the other to expand the slips into engagement with the well tool,*

*releasable latch means releasably latching the slip means and slip expander in unexpanded relationship,*

*and means for releasing said latch means in response to movement of said mandrel relative to said locator key means after said pin has been sheared,*

*said slips movable relative to said locator key means after said latch means is released and the slips are expanded by said resilient means to shift said slip means relative to said locator key means and shift the portion of the well tool engaged by said slip means.*

* * * * *